(12) United States Patent
Okita

(10) Patent No.: US 10,397,449 B2
(45) Date of Patent: Aug. 27, 2019

(54) IMAGE CAPTURING APPARATUS FOR STORING, AS IMAGE DATA, SIGNAL FROM PIXEL SENSIBLE TO LIGHT, IMAGE PROCESSING APPARATUS FOR PROCESSING SUCH IMAGE DATA, AND CONTROL METHOD THEREFOR

(71) Applicant: CANON KABUSHIKI KAISHA, Tokyo (JP)

(72) Inventor: Masaki Okita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/757,528

(22) PCT Filed: Sep. 1, 2016

(86) PCT No.: PCT/JP2016/003990
§ 371 (c)(1),
(2) Date: Mar. 5, 2018

(87) PCT Pub. No.: WO2017/043053
PCT Pub. Date: Mar. 16, 2017

(65) Prior Publication Data
US 2019/0028615 A1 Jan. 24, 2019

(30) Foreign Application Priority Data
Sep. 11, 2015 (JP) .................. 2015-180065

(51) Int. Cl.
*H04N 3/14* (2006.01)
*H04N 5/76* (2006.01)
(Continued)

(52) U.S. Cl.
CPC ........... *H04N 3/1568* (2013.01); *G03B 13/36* (2013.01); *H04N 3/1562* (2013.01);
(Continued)

(58) Field of Classification Search
CPC . G02B 7/34; G02B 7/36; G03B 13/36; G11B 27/28; H04N 1/32128;
(Continued)

(56) References Cited

U.S. PATENT DOCUMENTS

2009/0316014 A1* 12/2009 Lim .................... H04N 5/2254
348/222.1
2011/0096189 A1* 4/2011 Taniguchi ................ G02B 7/34
348/222.1
(Continued)

FOREIGN PATENT DOCUMENTS

| JP | 2014-146023 A | 8/2014 |
|---|---|---|
| JP | 2015-056710 A | 3/2015 |

*Primary Examiner* — Amy R Hsu
(74) *Attorney, Agent, or Firm* — Canon U.S.A., Inc. IP Division

(57) ABSTRACT

In an image capturing apparatus, an image sensing device includes a plurality of groups of pixels each including a plurality of photoelectric conversion elements, signals from the plurality of photoelectric conversion elements being readable separately for each photoelectric conversion element via a signal line used in common by each group of pixels. A reading unit performs, on a plurality of groups of pixels, a reading-out operation to reading out a signal as a first signal from part of the plurality of photoelectric conversion elements and a second reading-out operation to mix signals from the plurality of photoelectric conversion elements and read out a resultant mixed signal as an image signal. A generation unit generates one image file including the first signal, the image signal, and defect data indicating a group of pixels for which the first signal is defective while the image signal is not defective.

29 Claims, 17 Drawing Sheets

(51) Int. Cl.

| | |
|---|---|
| *H04N 5/217* | (2011.01) |
| *H04N 5/232* | (2006.01) |
| *H04N 5/265* | (2006.01) |
| *H04N 5/343* | (2011.01) |
| *H04N 5/367* | (2011.01) |
| *H04N 13/128* | (2018.01) |
| *H04N 13/296* | (2018.01) |
| *H04N 5/3745* | (2011.01) |
| *G03B 13/36* | (2006.01) |
| *H04N 13/232* | (2018.01) |
| *H04N 13/189* | (2018.01) |
| *H04N 13/111* | (2018.01) |

(52) U.S. Cl.
CPC ..... *H04N 5/2173* (2013.01); *H04N 5/232122* (2018.08); *H04N 5/265* (2013.01); *H04N 5/343* (2013.01); *H04N 5/367* (2013.01); *H04N 5/37457* (2013.01); *H04N 5/76* (2013.01); *H04N 13/111* (2018.05); *H04N 13/128* (2018.05); *H04N 13/189* (2018.05); *H04N 13/232* (2018.05); *H04N 13/296* (2018.05)

(58) Field of Classification Search
CPC ....... H04N 2101/00; H04N 2201/3252; H04N 2201/3277; H04N 5/23212; H04N 5/23216; H04N 5/23219; H04N 5/23293; H04N 5/3696; H04N 5/907
See application file for complete search history.

(56) References Cited

U.S. PATENT DOCUMENTS

| | | | | |
|---|---|---|---|---|
| 2011/0228127 | A1* | 9/2011 | Nakagawa | G02B 7/34 348/222.1 |
| 2012/0320241 | A1* | 12/2012 | Sugawara | H04N 5/3696 348/246 |
| 2013/0076931 | A1* | 3/2013 | Border | G02B 27/0075 348/222.1 |
| 2013/0329120 | A1* | 12/2013 | Hiasa | H04N 5/23212 348/345 |
| 2014/0192249 | A1* | 7/2014 | Kishi | H04N 5/23212 348/349 |
| 2014/0368690 | A1* | 12/2014 | Fukuda | H04N 5/369 348/222.1 |
| 2015/0264249 | A1* | 9/2015 | Shoda | H04N 5/23212 348/349 |
| 2015/0373251 | A1* | 12/2015 | Haneda | H04N 5/23212 348/345 |
| 2017/0078578 | A1* | 3/2017 | Sato | H04N 5/23293 |
| 2017/0295329 | A1* | 10/2017 | Ichikawa | H04N 1/409 |

* cited by examiner

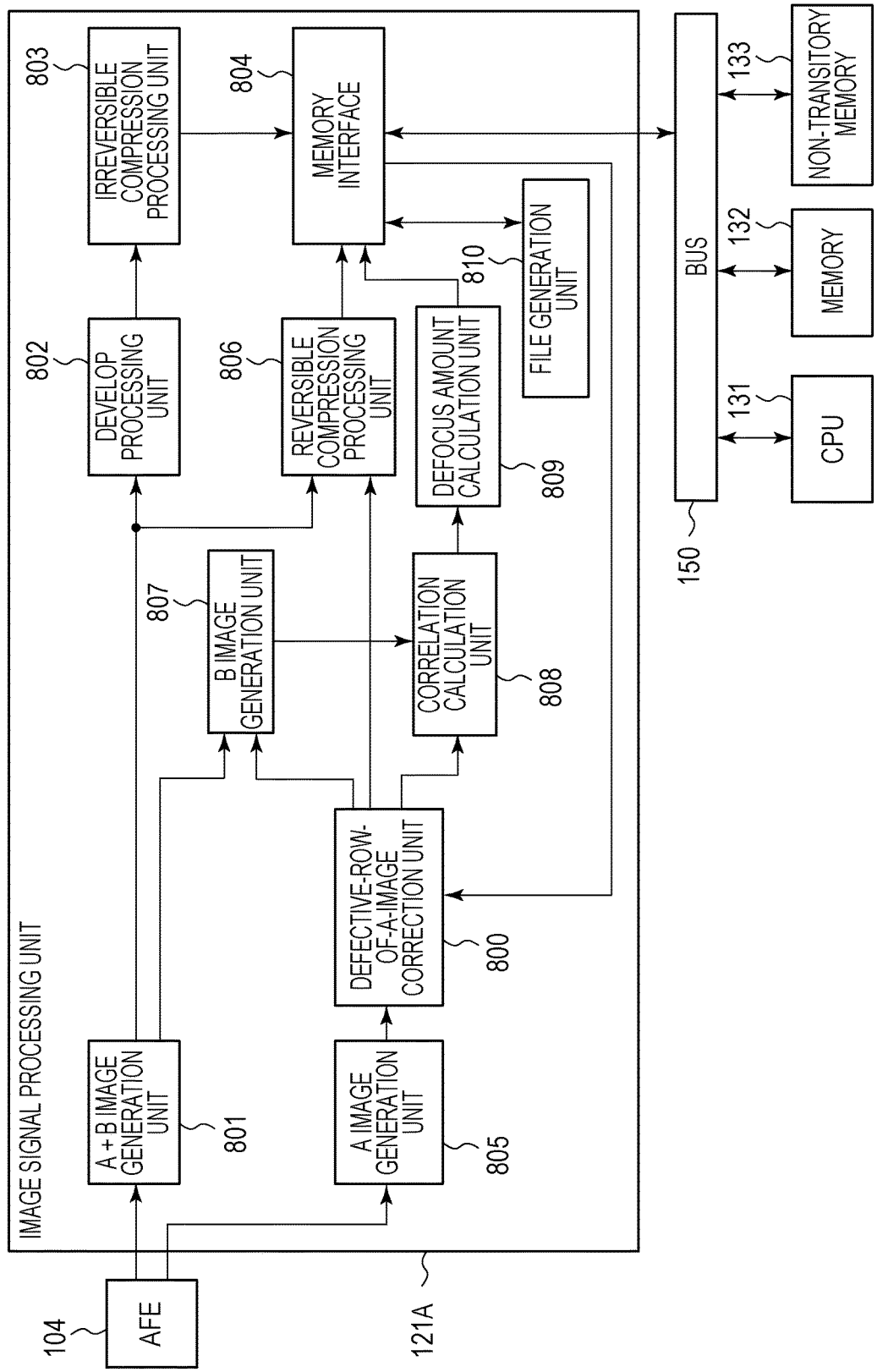

| NON-DEFECTIVE ROW | x0 | x1 | x2 | | xn |
|---|---|---|---|---|---|
| DEFECTIVE ROW | x0 | x1 | x2 | ↓ | xn |

FIG. 12

| TOTAL NUMBER OF PIECES OF DEFECTIVE ROW DATA = X |
| --- |
| DEFECTIVE ROW DATA #1 |
| DEFECTIVE ROW DATA #2 |
| DEFECTIVE ROW DATA #3 |
| ... |
| DEFECTIVE ROW DATA #X |

IMAGE CAPTURING APPARATUS FOR STORING, AS IMAGE DATA, SIGNAL FROM PIXEL SENSIBLE TO LIGHT, IMAGE PROCESSING APPARATUS FOR PROCESSING SUCH IMAGE DATA, AND CONTROL METHOD THEREFOR

TECHNICAL FIELD

The present disclosure relates to an image capturing apparatus configured to store, as image data, signals from pixels each sensible to light passing through a different pupil area of an imaging optical system, an image processing apparatus configured to process such image data, and a method therefor.

BACKGROUND ART

It has been proposed to configure an image capturing apparatus such that an exit pupil of an imaging lens is divided into a plurality of pupil areas, and it is possible to simultaneously capture a plurality of parallax images depending on the divided pupil areas. PTL 1 includes a description about a defect caused by a short-circuit that may occur, when signals from PDs are read out via signal lines, between a signal line for reading out a signal from a PD corresponding to one of divided pupil areas and another signal line for reading out a signal from a PD corresponding to another pupil area. To handle the situation in which signals from two PDs are mixed in reading signals when signal lines are short-circuited, PTL 1 discloses a technique to detect a phase difference without using signals from a group of pixels having a defective signal line. In the technique disclosed in PTL 1, a recorded image is originally obtained by mixing image signals from two PDs, and thus an influence from defects described above does not occur.

CITATION LIST

Patent Literature

PTL 1: Japanese Patent Laid-Open No. 2014-146023
The present disclosure provides a technique to handle the above-described situation.

SUMMARY OF INVENTION

In an aspect of the present disclosure, an image capturing apparatus includes an image sensing device including a plurality of groups of pixels, each pixel of each group of pixels including a plurality of photoelectric conversion elements, signals from the plurality of photoelectric conversion elements being readable separately for each photoelectric conversion element via a signal line used in common by each group of pixels, a reading unit configured to perform, on a plurality of groups of pixels, a reading-out operation to read out a signal as a first signal from part of the plurality of photoelectric conversion elements and a second reading-out operation to mix signals from the plurality of photoelectric conversion elements and read out a resultant mixed signal as an image signal, a correction unit configured to make a correction based on defect data which is data indicating a defective group of pixels for which the first signal is defective owing to a defect of a signal line while the image signal is not defective, the correction being made on the first signal read out from the defective group of pixels, and a generation unit configured to generate one image file including the first signal corrected by the correction unit and the image signal.

Advantageous Effects of Invention

According to the present disclosure, it is possible to reduce an influence of a defect that may occur in part of a parallax image of an image sensing device on a recorded parallax image. It is also possible to reduce an influence of a defect that may occur in part of a parallax image on image processing or an image subjected to the image processing.

In an aspect of the present disclosure, an image processing apparatus including an acquisition unit configured to acquire an image file including a first signal, an image signal, and defect data, the first signal and the image signal being signals obtained from an image sensing device, the image sensing device including a plurality of groups of pixels, each pixel of each group of pixels including a plurality of photoelectric conversion elements, signals from the plurality of photoelectric conversion elements being readable separately for each photoelectric conversion element via a signal line used in common by each group of pixels, the first signal being a signal from part of the plurality of photoelectric conversion elements, the image signal being a signal obtained by mixing signals from the plurality of photoelectric conversion elements, the defect data being data indicating a group of pixels for which the first signal is defective owing to a defect of a signal line while the image signal is not defective, a decoding unit configured to decode the image signal and the first signal from the image file, a decoded-signal correction unit configured to correct the defect of the first signal decoded by the decoding unit based on the defect data, and an image processing unit configured to perform image processing on the first signal corrected by the decoded-signal correction unit and the image signal.

In an aspect, the present disclosure provides a method of controlling an image capturing apparatus including an image sensing device, the image sensing device including a plurality of groups of pixels, each pixel of each group of pixels including a plurality of photoelectric conversion elements, signals from the plurality of photoelectric conversion elements being readable separately for each photoelectric conversion element via a signal line used in common by each group of pixels, the method including performing a first reading-out operation on a plurality of groups of pixels to read out a signal as a first signal from part of the photoelectric conversion elements, performing a second reading-out operation on a plurality of groups of pixels to mix signals from the plurality of photoelectric conversion elements and read out a resultant mixed signal as an image signal, and making a correction based on defect data which is data indicating a defective group of pixels for which the first signal is defective owing to a defect of a signal line while the image signal is not defective, the correction being made on the first signal read out from the defective group of pixels, and generating one image file including the corrected first signal and the image signal.

In an aspect, the present disclosure provides a method of controlling an image capturing apparatus including an image sensing device, the image sensing device including a plurality of groups of pixels, each pixel of each group of pixels including a plurality of photoelectric conversion elements, signals from the plurality of photoelectric conversion elements being readable separately for each photoelectric conversion element via a signal line used in common by each group of pixels, the method including performing a first reading-out operation on a plurality of groups of pixels to read out a signal as a first signal from part of the photoelectric conversion elements, performing a second reading-out operation on a plurality of groups of pixels to mix signals from the plurality of photoelectric conversion elements and read out a resultant mixed signal as an image signal, and generating one image file including defect data, the first signal, and the image signal, the defect data being data indicating a group of pixels for which the first signal is defective owing to a defect of a signal line while the image signal is not defective.

Further features of the present invention will become apparent from the following description of exemplary embodiments with reference to the attached drawings.

BRIEF DESCRIPTION OF DRAWINGS

FIG. 8 is a block diagram illustrating an example of a configuration of an image signal processing unit according to the first embodiment.

FIG. 12 is a diagram schematically illustrating a format of defect row data according to the first embodiment.

DESCRIPTION OF EMBODIMENTS

First Embodiment

In a case where a parallax image including a defective pixel signal is stored in a storage medium such as a non-transitory memory or the like, it is necessary to perform something on the defect to handle an influence of the defect. When a parallax image is obtained using an image sensing device having a defect (for example, a short-circuited signal line), if the parallax image includes a defective image signal, it is difficult to correctly perform a process using a parallax image such as a focusing process, a process of generating a virtual viewpoint image, or the like in an area including the defect pixel. In view of the above, a first embodiment provides an image capturing apparatus configured to acquire a plurality of parallax images via capturing an image and stores the acquired parallax images, wherein an image file including a parallax image is generated in a manner depending on a defect that may occur in part of parallax images while no defect occurs in an image signal read out together with the parallax image, and the first embodiment also provides a control method therefor. The present embodiment also provides an image processing apparatus configured to perform image processing using a recorded image file including a plurality of parallax images, wherein the image processing is performed in a manner depending on a defect in part of the parallax images, and the first embodiment also provides a control method therefor.

Configuration of Image Capturing Apparatus

Figure 1:
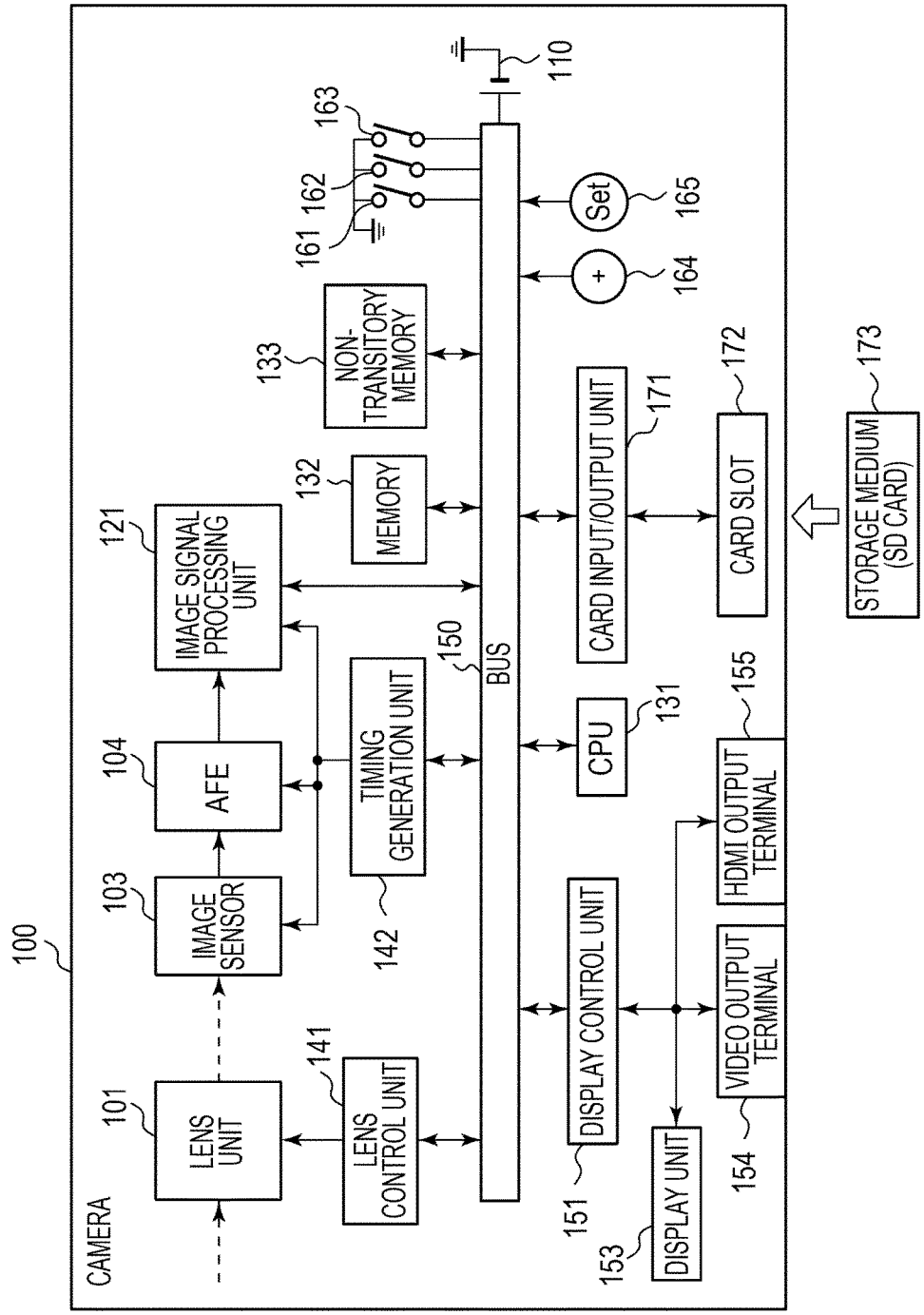
FIG. 1 is a block diagram illustrating an example of a configuration of an image capturing apparatus according to a first embodiment.

FIG. 1 is a block diagram illustrating an example of a configuration of a camera 100, which is an image capturing apparatus according to the present embodiment. Note that one or more functional blocks shown in FIG. 1 or FIGS. 8 and 13 described later may be realized using hardware such as an ASIC, programmable logic array (PLA), or the like, or may be realized by a programmable processor such as a CPU, an MPU, or the like by executing software. Alternatively, the one or more functional blocks may be realized by a combination of software and hardware. Thus, in the following description, even in a case where different functional blocks are involved in operations, the functions thereof may be realized using the same single piece of hardware.

The camera 100 is an image capturing apparatus in which an image sensing device 103 and a lens unit 101 are integrated. Alternatively, the lens unit 101 may be attachable/removable to or from a camera body (the camera 100) via a lens mount.

The lens unit 101 includes a focus lens, a zoom lens, and an aperture, through which an optical image of an object is formed on an image sensing device 103, and also includes a driving unit thereof.

A lens controller 141 is a driving control unit of the lens unit 101, and is configured to send a signal to a driving unit such as a motor or like included in the lens unit 101 thereby controlling the lens unit 101 in terms of zooming, focusing, and an aperture operation.

The image sensing device 103 is a photoelectric conversion unit realized using a CMOS sensor or the like. The image sensing device 103 is capable of converting an object image formed through an imaging optical system including the lens unit 101 to an electric signal, and outputting the resultant electric signal.

A timing generator 142 provides timing to the image sensing device 103 and the image signal processing unit 121.

A bus 150 is connected to the units described above, and the bus 150 is also connected to the lens controller 141, a power supply 110, a memory 132, a non-transitory memory 133, a display control unit 151, a card input/output unit 171, and various switches.

The various switches include a main switch 161, a first release switch 162, a second release switch 163, an arrow button 164, and a set button 165. The various switches may further include an input interface such as a touch panel provided on a display unit 153. The touch panel is capable of displaying icons corresponding to the respective functions on a screen such that the icons may be selected to perform switching operations instead of using switches.

The power supply 110 supplies electric power via the bus 150 to various circuits disposed in the camera 100.

In the display control unit 151, in response to a signal supplied from the timing generator 142 via the bus 150, a digital-to-analog conversion unit (not shown) converts display image data stored in the memory 132 from digital image data to analog image data. The resultant analog image data is displayed on the display unit 153 realized using liquid crystal display elements, TFTs, and the like or displayed on an external display unit (not shown) disposed in the outside via a cable connected to a video output terminal 154, an HDMI (registered trademark) output terminal 155, or the like.

A card slot 172 is configured such that a touchable/removable storage medium 173 such as an SD card or the like is allowed to be inserted in the card slot 172. In a state in which the storage medium 173 is inserted in the card slot 172, the storage medium 173 is electrically connected to a card input/output unit 171. In this state, it is possible to transfer image data stored in the memory 132 to the storage medium 173. It is also possible to read out data stored in the storage medium 173 to the camera 100.

A CPU 131 is connected via the bus 150 to various units described above in the camera 100. The CPU 131 functions as a control unit that generally controls various units in the camera 100. In the present embodiment, the CPU 131 instructs the lens controller 141, the timing generator 142, the image signal processing unit 121, and the display control unit 151 to control various parts in the camera 100. Alternatively, without providing control units or processing units such as those described above, the CPU 131 may controls driving of various parts in the camera 100. Alternatively, without providing the CPU 131, the control units and the processing units described above may operate in cooperation with each other to control driving of various parts in the camera 100.

The first release switch 162 turns on when a release button (not shown) is pressed by a first stroke (into a half-pressed state), and a process of preparing for capturing an image of a subject is started. More specifically, in the preparation for capturing an image, the lens controller 141 controls the driving of the lens unit 101, as required, in terms of the focusing, the zooming, and the aperture controlling operation, or the like.

Next, the second release switch 163 turns on when the release button (not shown) is pressed by a second stroke (into a fully-pressed state), and capturing of the image of the subject is started.

Configuration of Image Sensing Device

Figure 2:
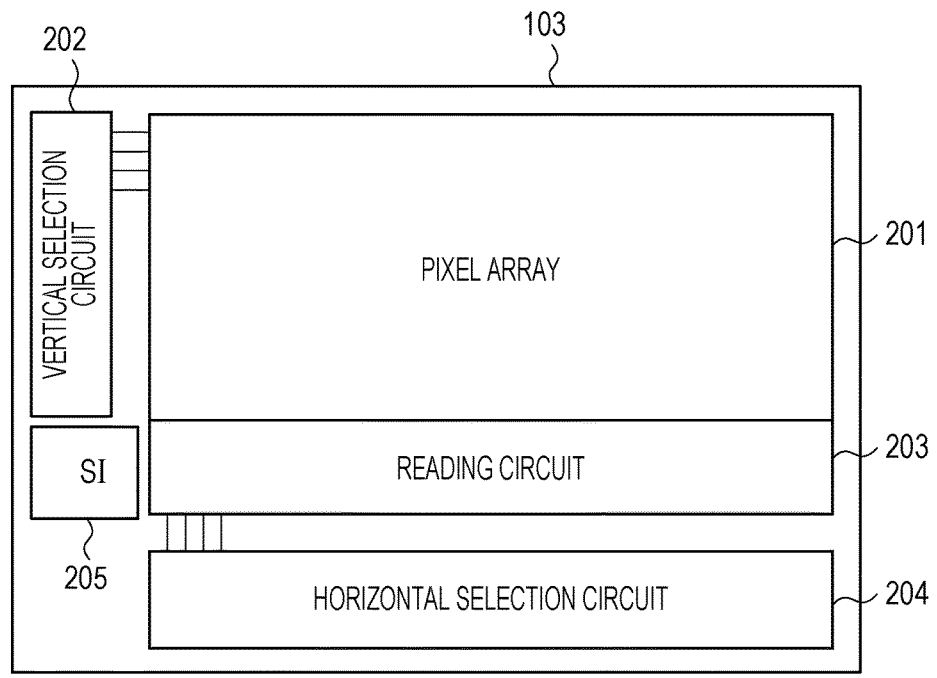
FIG. 2 is a diagram schematically illustrating an overall configuration of an image sensing device according to the first embodiment.

FIG. 2 illustrates the image sensing device 103. In FIG. 2, the image sensing device 103 includes a pixel array 201, a vertical selection circuit 202 configured to select a row in the pixel array 201, and a horizontal selection circuit 204 configured to select a column in the pixel array 201. The image sensing device 103 also includes a reading circuit 203 configured to read out signals from pixels selected, by the vertical selection circuit 202, from the pixel array 201, and a serial interface (SI) 205 for externally determining operation modes of various circuits. The reading circuit 203 includes a memory for accumulating a signal, a gain amplifier, an analog-to-digital converter, and the like for each column. Typically, the vertical selection circuit 202 sequentially selects a plurality of rows in the pixel array 201 and the reading circuit 203 reads out pixel signals from the selected row. The image sensing device 103 further includes a horizontal selection circuit 204 configured to sequentially select and output, on a column-by-column basis, pixel signals read out by the reading circuit 203.

Figure 3A:
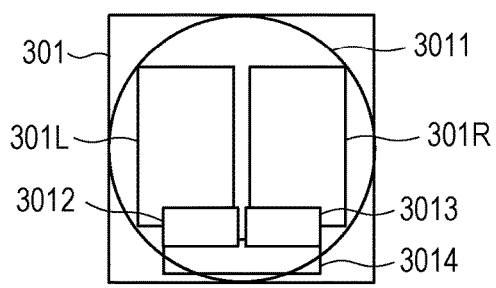
FIG. 3A is a diagram briefly illustrating a configuration of a pixel in an image sensing device according to the first embodiment.

FIG. 3A is a diagram illustrating in a simplified manner a configuration of one pixel in the image sensing device 103 according to the present embodiment. In FIG. 3A, one pixel 301 includes one microlens 3011, and two photodiodes (PD) 301L and 301R functioning as photoelectric conversion elements. The one pixel 301 further includes transfer switches 3012 and 3013 configured to read out respective signals accumulated in the PD 301L and the PD 301R, and a floating diffusion (FD) region 3014 configured to temporarily store the signals from the PD 301L and the PD 301R. Each pixel includes a plurality of constituent elements described later in addition to constituent elements shown in FIG. 3A.

Figure 3B:
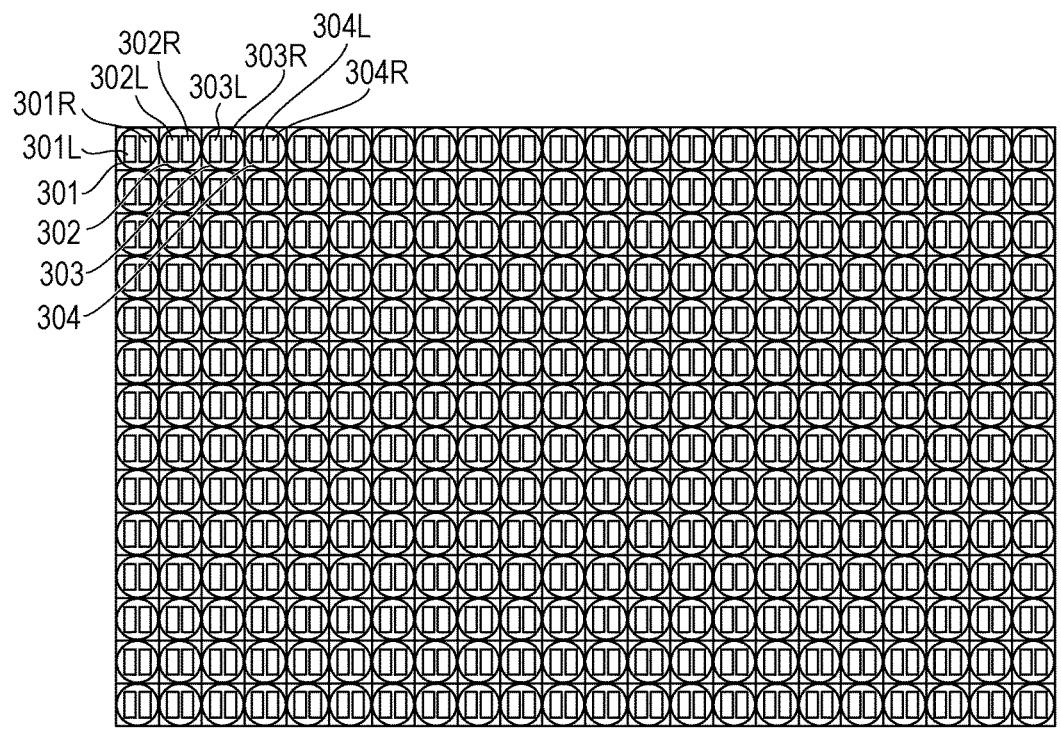
FIG. 3B is a plan view illustrating a part of a pixel array.

FIG. 3B is a plan view briefly illustrating a part of the pixel array 201. To provide a two-dimensional image, the pixel array 201 includes a plurality of pixels arranged in the form of a two-dimensional array, where each pixel is configured as shown in FIG. 3A. Pixels 301, 302, 303, and 304 are taken as examples in the following explanation. 301L, 302L, 303L, and 304L each correspond to the PD 301L shown in FIG. 3A, and 301R, 302R, 303R, and 304R each correspond to the PD 301R shown in FIG. 3A.

Figure 4:
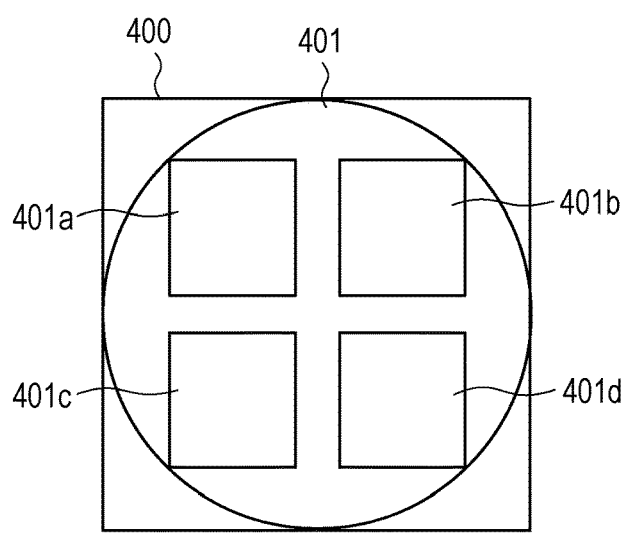
FIG. 4 is a diagram briefly illustrating an example of a configuration of a pixel of an image sensing device.

The configuration of the image sensing device is not limited to that described above. For example, one pixel may have two or more divided parts as shown in FIG. 4. In the example shown in FIG. 4, one pixel includes four PDs 401a, 401b, 401c, and 401d, although the number of PDs is not limited to four as long as the number is equal to or greater than two. In this structure, a plurality of PD outputs may be selectively added together. For example, PD outputs of 401a and 401c, and those of 401b and 401d may be respectively added together thereby obtaining two outputs, or PD outputs of 401a and 401b, and those of 401c and 401d may be respectively added together thereby obtaining two outputs.

Figure 5:
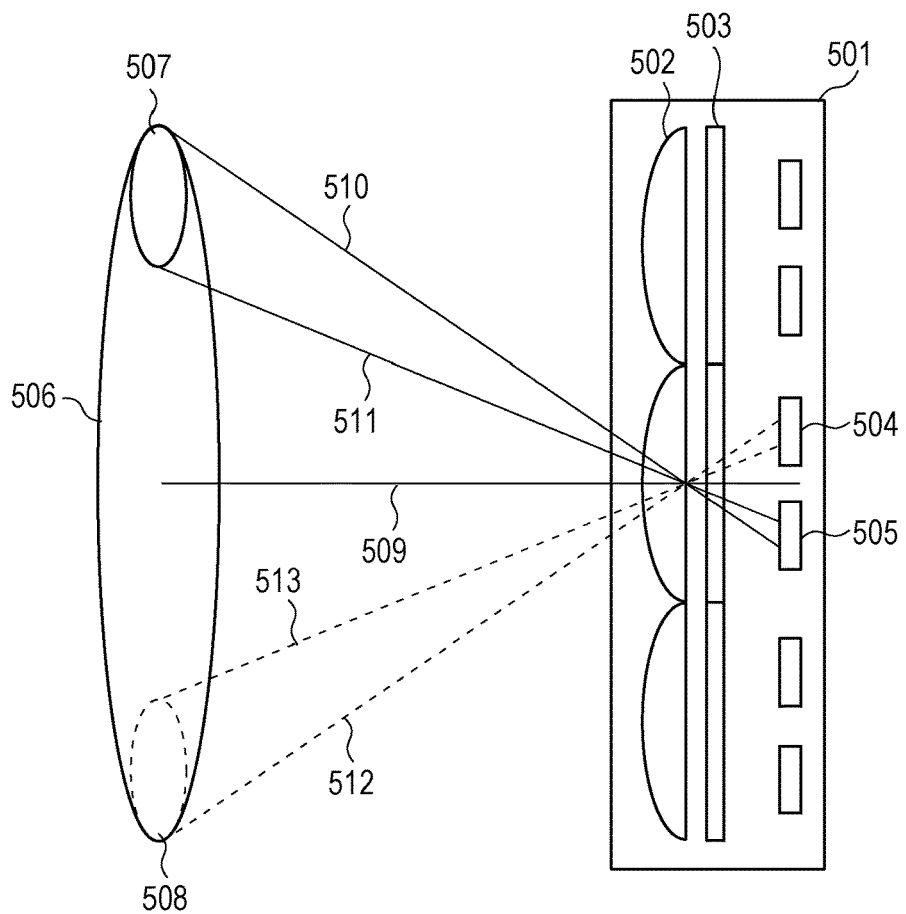
FIG. 5 is a diagram schematically illustrating a manner in which an image of an object is formed on pixels according to the first embodiment.

Referring to FIG. 5, an explanation is given below as to a manner in which light is sensed by the image sensing device 103 having the pixel configuration such as that shown in FIG. 3 or FIG. 4. FIG. 5 is a conceptual diagram illustrating a manner in which a light ray exits an imaging lens through its exit pupil and is incident on the image sensing device 103, 501 denotes a cross section of a pixel array. 502 denotes a microlens. 503 denotes a color filter. 504 and 505 respectively denote PDs. The PD 504 and the PD 505 respectively correspond to the PD 301L and the PD 301R shown in FIGS. 3A and 3B. 506 denotes the exit pupil of the imaging lens in the lens unit 101. In this structure, each pixel has a microlens 502, and an optical axis 509 for each pixel is defined by a center of a light ray emerging from the exit pupil. After emerging from the exit pupil, light is incident, about the optical axis 509, on the image sensing device 103, 507 and 508 respectively denote partial areas of the exit pupil of the imaging lens. An envelope of a light ray passing through a partial area 507 of the exit pupil is denoted by 510 and 511, while an envelope of a light ray passing through a partial area 508 of the exit pupil is denoted by 512 and 513. As may be seen from this figure, of the light rays emerging from the exit pupil, an upper light ray about the optical axis 509 is incident on the PD 505, while a lower light ray is incident on the PD 504. That is, the PD 504 and the PD 505 receive light coming from different areas of the exit pupil of the imaging lens. This feature makes it possible to acquire at least two images with difference parallaxes. Hereinafter, an image signal obtained from signals detected by the PD 504 (PD 505) and other PDs that detect light rays coming from the same area of the exit pupil as the area through which the light ray detected by the PD 504 (PD 505) passes will be referred to simply as an A image (B image). Furthermore, an image obtained by mixing (adding together) signals detected by the PD 504 and the PD 505 (the PD 301L and the PD 301R) and other PDs that detect light rays coming from the same areas of the exit pupil as those detected by the respective PDs 504 and 505 will be referred to as an A+B image.

Figure 6:
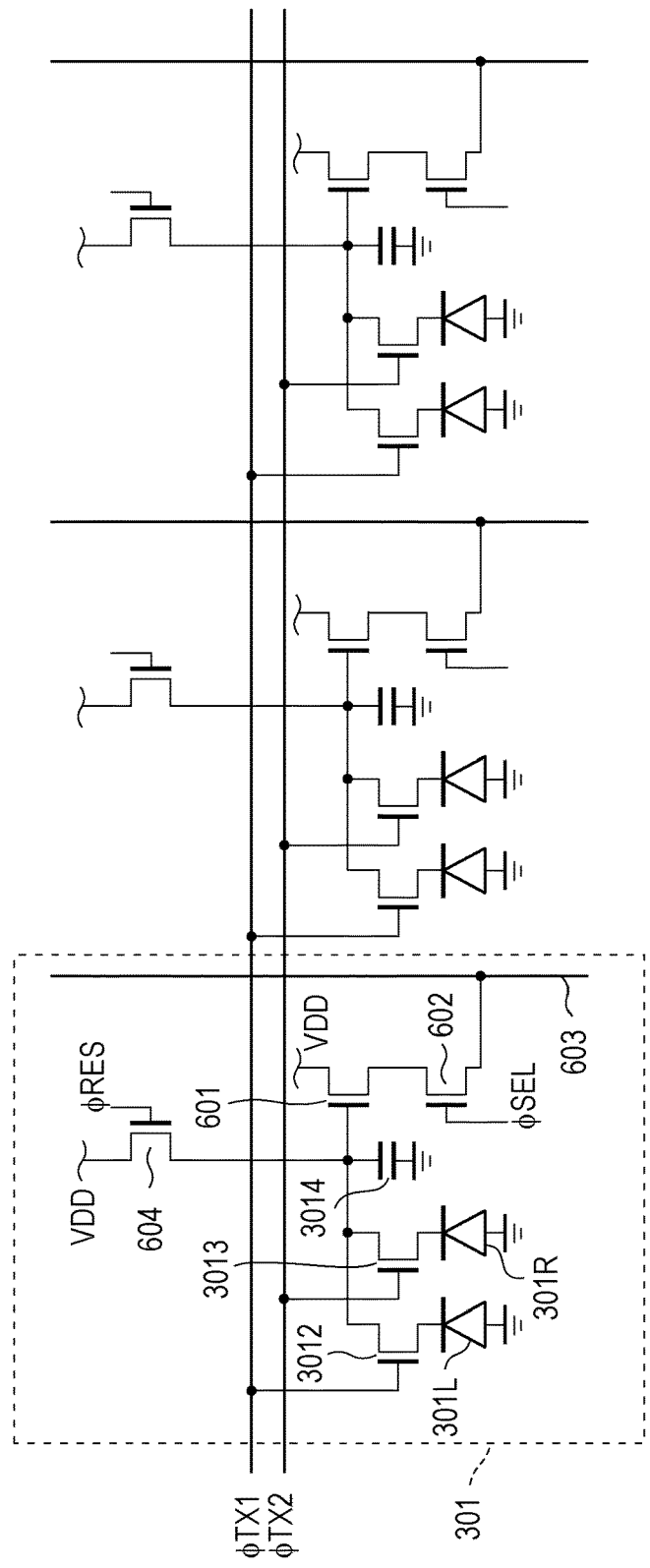
FIG. 6 is a diagram briefly illustrating a circuit configuration of a pixel according to the first embodiment.

FIG. 6 is an equivalent circuit diagram illustrating a circuit configuration of pixels each configured as shown in FIG. 3A. In FIG. 6, pixels in three columns and one row are schematically illustrated. In FIG. 6, similar elements to those in FIG. 2 are denoted by similar reference numerals or symbols. Transfer switches 3012 and 3013 of a pixel 301 are respectively driven by transfer pulses φTX1 and φTX2 and, in response, they transfer photo-charges respectively generated by corresponding the PD 301L and the PD 301R to an FD region 3014. The FD region 3014 functions as a buffer for temporarily accumulating a charge. 601 denotes a MOS amplifier functioning as a source follower, and 602 denotes a selection switch configured to select a pixel according to a vertical selection pulse φSEL. The FD region 3014, the MOS amplifier 601, and a constant current source (not shown) connected to a vertical output line 603 form a floating diffusion amplifier. A signal charge of the FD region 3014 of the pixel selected by the selection switch 602 is converted to a voltage by the floating diffusion amplifier. The resultant voltage is output to the vertical output line 603 and is read out to the reading circuit 203, 604 denotes a reset switch configured to, in response to a reset pulse φRES, reset the FD region 3014 by VDD.

As described above, the PD 301L and the PD 301R respectively have their own transfer switches 3012 and 3013. However, in the circuit within the pixel, circuit elements including the FD region 3014 and following elements for reading out signals are shared by the PD 301L and the PD 301R. This circuit configuration makes it possible to reduce the pixel size. Furthermore, as shown in FIG. 6, lines for providing the transfer pulses φTX1 and φTX2 are shared by pixels disposed in each row. That is, the image sensing device 103 includes a plurality of groups (rows) of pixels, and each pixel in each group of pixels includes a plurality of photoelectric conversion elements such that signals from the plurality of photoelectric conversion elements are read out, separately for each photoelectric conversion element, via the signal line used in common by the group of pixels.

Figure 7:
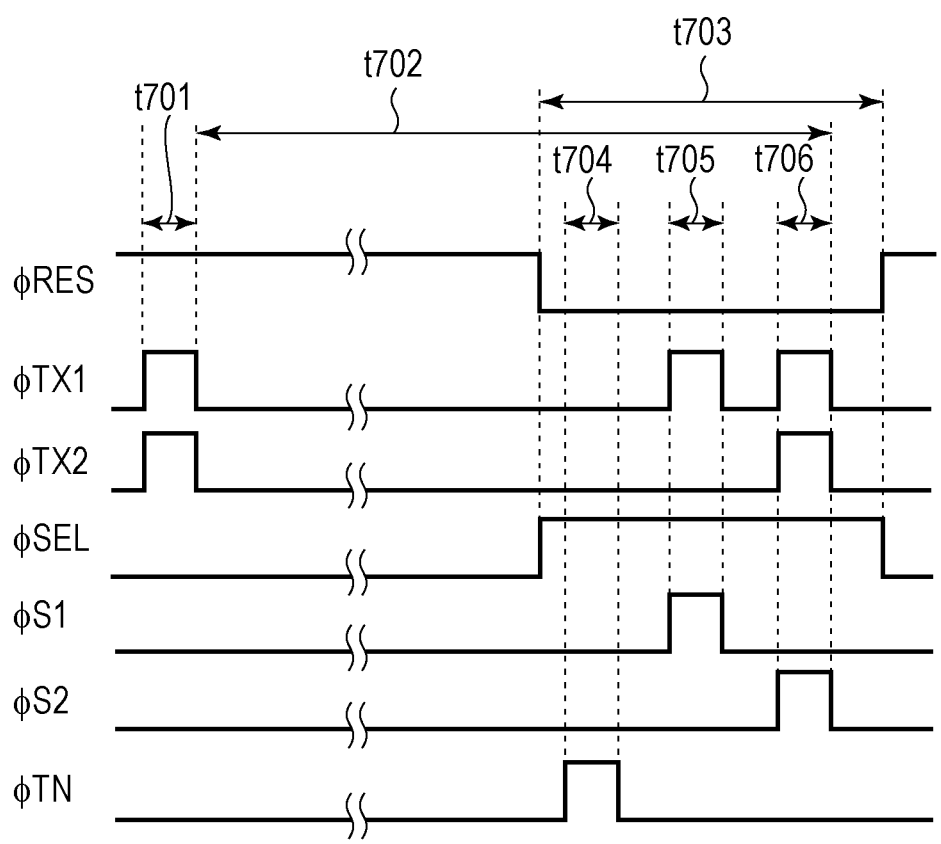
FIG. 7 is a timing chart illustrating a driving timing pattern of an image sensing device according to the first embodiment.

Next, a method of driving the image sensing device 103 configured in the above-described manner is described below. FIG. 7 is a timing chart illustrating a driving pattern for a case in which signals of one row are read out to the reading circuit 203. First, during a period t701, the reset pulse φRES and the transfer pulses φTX1 and φTX2 are simultaneously changed to a high potential level (hereinafter referred to as an "H-level"). As a result, the reset switch 604 and the transfer switches 3012 and 3013 turn on, and the potentials of the PD 301L, the PD 301R, and the FD region 3014 are reset to an initial potential VDD. Thereafter, when the transfer pulses φTX1 and φTX2 go to a low potential level (hereinafter referred to as an "L-level"), accumulation of charge starts in the PD 301L and the PD 301R.

Then during a period t703 after a particular time defined as a charge storage time has elapsed, the selection pulse φSEL is changed to the H-level thereby turning on the selection switch 602. As a result, a row to read is selected and a reading operation is performed to read out signals of one row. Simultaneously, the reset pulse φRES is changed to the L-level thereby releasing the FD region 3014 from the reset state.

During a period t704, φTN is changed to the H-level, and an N signal serving as a reset signal of the FD region 3014 is read out to the reading circuit 203 and is stored therein. Although not shown in the figure, the reading circuit 203 reads out the potential of the FD region 3014 via the vertical output line 603 under the control of φTN, φS1, and φS2 and stores the read signals. Next, during a period t705, the transfer pulse φTX1 is changed to the H-level thereby turning on the transfer switch 3012. As a result, a photo-charge generated in the PD 301L is transferred to the FD region 3014. At the same time, φS1 is also changed to the H-level, and thus a first PD signal from the PD 301L is stored in the reading circuit 203.

Next, during a period t706, while maintaining the reset switch 604 in the off-state, the transfer pulses φTX1 and φTX2 are simultaneously changed to the H-level thereby turning on the transfer switches 3012 and 3013. As a result, a photo-charge generated in the PD 301R and a photo-charge generated in the PD 301L are additionally transferred to the FD region 3014 where the already-transferred charge exists. At the same time, φS2 is also changed to the H-level, and thus the optical signal from the PD 301L, the optical signal from the PD 301R, and a noise signal are added together, and stored as a second PD signal in the reading circuit 203. Because the transfer pulse φTX1 was turned on during the period t705, and the signal from the PD 301L has already been transferred to the FD region 3014, the transfer pulse φTX1 may be in the off-state during the period t706. More strictly speaking, an accumulation time t702 is a period from the end of the period t701 to the end of the period t706. Furthermore, the timing of changing the transfer pulse φTX2 to the H-level to reset the PD 301L may be delayed by an amount corresponding to the time difference between t706 and t705.

Based on the N signal, the first PD signal, and the second PD signal read to the reading circuit 203 in the operation described above, the A image signal (first signal) obtained by subtracting the noise signal from the first PD signal, and the image signal obtained by subtracting the noise signal from the second PD signal are output to the outside of the image sensing device 103. This image signal is a signal obtained by combining the signal from the PD 301L and the signal from the PD 301R, and thus it is possible to generate a B image signal (second signal) by subtracting the A image signal from the image signal (A+B image) by using a signal processing circuit or the like disposed in a following circuit stage.

Thus, it is possible to obtain the A image signal, the image signal, and the B image signal via the operation described above. Next, a discussion is given below on a situation in which a line of the transfer pulse φTX1 and a line of the transfer pulse φTX2 are short-circuited during a production process, and thus a defective signal line occurs. In this situation, during the period t705, the level of the transfer pulse φTX2 is at the H-level although its correct level is the L-level. In this case, in the operation to read out the first PD signal, the second PD signal is read out instead of the first PD signal. In the operation to read out the second PD signal, both transfer pulses φTX1 and φTX2 are at the H-level, and thus no influence occurs. Thus, in a row in which the line of the transfer pulse φTX1 and the line of the transfer pulse φTX2 are short-circuited to each other in a particular row, the A image signal read-out in this row is the same as the image signal, although the image signal is correctly output. Furthermore, nothing is output for the B image signal, which is the signal obtained by subtracting the A image signal from the image signal. That is, in this row, although the image signal has no problem, a defect occurs for the A image signal and the B image signal. If a defect occurs in the A image or the B image, which is a parallax image, it is difficult to correctly detect a focus or generate a defocus map by calculating the correlation between the parallax images (by detecting the phase difference) in the image capturing operation, or it is difficult to correctly perform a refocusing process to change the focal position or virtual viewpoint image processing to generate a virtual viewpoint image in the image processing after the image capturing operation.

In the present embodiment, to handle the above situation, when the calculation using the parallax image (A image signal) is performed in the camera in the image capturing operation, no correction is performed on signals output from a pixel group having a defect, and the calculation is performed without using the signals from the pixel group having the defect. This makes it possible to prevent an increase in processing load or time lag for occurring owing to the correction process in the image capturing operation. Note that in the correlation calculation process or the like in the image capturing operation, the removal of the signals from the pixel group having the defect does not result in a significant problem with processing accuracy.

On the other hand, as for a parallax image to be recorded, a correction is performed on signals from a pixel group having a defect. This is to prevent a defect from remaining in the recorded parallax image having a possibility of being used as an ornamental image or output to an external general-purpose apparatus. Furthermore, in the image processing performed after the recording, high image quality and high accuracy are required in the refocus process, the process of generating a virtual viewpoint image, or the like, and thus it is useful to make the correction on images to be recorded.

Next, a detailed description is given below as to a configuration and an operation of the image signal processing unit 121 configured to perform a focus adjustment process including a correlation calculation on the A+B image and the A image obtained by the image sensing device 103 as described above, and record the resultant A+B image and the A image in a single image file.

Configuration of Image Signal Processing Unit

FIG. 8 is a block diagram illustrating a configuration of an image signal processing unit 121A, which is a part of the image signal processing unit 121. The image signal processing unit 121A is connected, via a bus 150, to a CPU 131, a memory 132, and a non-transitory memory 133.

The memory 132 temporarily stores image data output from the image signal processing unit 121A and other data used by the CPU 131 in various processes.

The non-transitory memory 133 stores program data executed by the CPU 131, and data of defective row in A image (defect data) depending on a device-by-device difference of the image sensing device 103. The data of the defective rows of the A image is measured and stored in advance when the apparatus is produced and shipped. The defective rows of the A image may be measured again by an engineer at a support center or the like when maintenance is performed, and the data thereof may be stored.

The A+B image generation unit 801 corrects the A+B image sequentially output from the AFE 104, depending on the device-by-device difference of the image sensing device 103 or the like, and outputs the corrected A+B image.

The develop processing unit 802 receives the A+B image output from the A+B image generation unit 801 and performs a developing process and other various correction processes on the A+B image, such as a white-balance correction on a digital image, a color interpolation, a color correction, a gamma conversion, an edge enhancement, a resolution conversion, and the like The irreversible compression processing unit 803 performs an irreversible compression process such as a JPEG compression and outputs the resultant irreversibly compressed image to the memory 132 via a memory interface 804.

The A image generation unit 805, as with the A+B image generation unit 801, makes a correction on the A image sequentially output from the AFE 104 depending on the device-by-device difference of the image sensing device 103 or the like, and outputs the corrected A image.

The defective-row-of-A-image correction unit 800 performs a defective row correction on the A image sequentially output from the AFE 104 based on the defect row data stored in the non-transitory memory 133.

The B image generation unit 807 generates a B image from the A+B image and the A image respectively output from the A+B image generation unit 801 and the A image generation unit 805 by subtracting the A image from the A+B image.

The reversible compression processing unit 806 performs a reversible compression coding process on the images respectively input from the A+B image generation unit 801 and the defective-row-of-A-image correction unit 800, and output the resultant reversibly compressed images to the memory 132 via the memory interface 804.

The correlation calculation unit 808 performs a correlation calculation to obtain a correlation waveform from the A image and the B image respectively output from the A image generation unit 805 and the B image generation unit 807. Details of the correlation calculation process will be described later.

A defocus amount calculation unit 809 calculates a deviation between images based on the correlation waveform obtained in the correlation calculation unit 808, and converts the resultant deviation between images to an amount of defocus thereby determining the amount of defocus in an area of interest in the image. The lens controller 141 performs a focus adjustment by controlling the driving of the focus lens of the lens unit 101 based on the calculated amount of defocus.

The file generation unit 810 acquires image data generated by the reversible compression processing unit 806 or the irreversible compression processing unit 803 and data including data of defective rows in the A image stored in advance or the like via the memory interface 804, and the file generation unit 810 generates an image file including the acquired image data.

In the present embodiment, the defective-row-of-A-image correction unit 800 does not perform the defective row correction on the A image to be output to the correlation calculation unit 808, but the defective-row-of-A-image correction unit 800 performs the defective row correction on the A image to be output to the reversible compression processing unit 806. As described above, the defective-row-of-A-image correction unit 800 is capable of disabling the correction function depending on the process to be performed next.

Figures 9A, 9B:
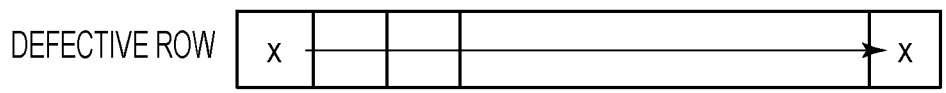
FIG. 9A is a diagram schematically illustrating defective row data.
FIG. 9B is a diagram schematically illustrating a manner in which defective row data is interpolated.

The defective row correction is performed using, for example, an interpolation from an upper-adjacent same-color row as shown in FIGS. 9A and 9B. FIG. 9A is a schematic diagram illustrating a defective row that has occurred in the horizontal direction of the screen. FIG. 9B is a schematic diagram illustrating a process of an interpolation from upper row in which pixel values in the defective row shown in FIG. 9A are respectively replaced by pixel values in a non-defective row upwardly adjacent to the defective row. Alternatively, pixel values in the defective row may be respectively replaced by pixel values in a non-defective row downwardly adjacent to the defective row or pixel values in the defective row may be respectively replaced by values obtained by linear interpolation or the like using both upwardly and downwardly adjacent rows. Note that "adjacent" does not necessarily mean that pixels of interest are directly adjacent to each other, but they may be at closest locations among pixels covered with filters of the same color. Furthermore, adjacent rows do not necessarily mean that they are located directly next to each other, but the interpolation may be performed using pixel values of neighboring rows.

Furthermore, the B image is obtained by subtracting the A image, obtained after the interpolation from the upper row on defective rows, from the A+B image. Note that the A image and the A+B image are obtained via analog-to-digital conversions performed at different timings, and thus analog noise components caused by the time difference in the analog-to-digital conversion are superimposed.

When image processing such as the interpolation from the upper row or the like is performed over a wide area, a resultant image generally has an unnatural monotonic color tone. However, in the present embodiment, the interpolation is performed on one-row data of an A image, and thus converting to a B image results in better image quality.

Image Capturing and Recording Operation of Image Capturing Apparatus

Referring to flow charts shown in FIGS. 10A, 10B, and 10C, an operation of the image capturing apparatus according to the present embodiment is described below. The process described in each flow chart is executed by the CPU 131 or by various units according to instructions provided thereto from the CPU 131.

Figure 10A:
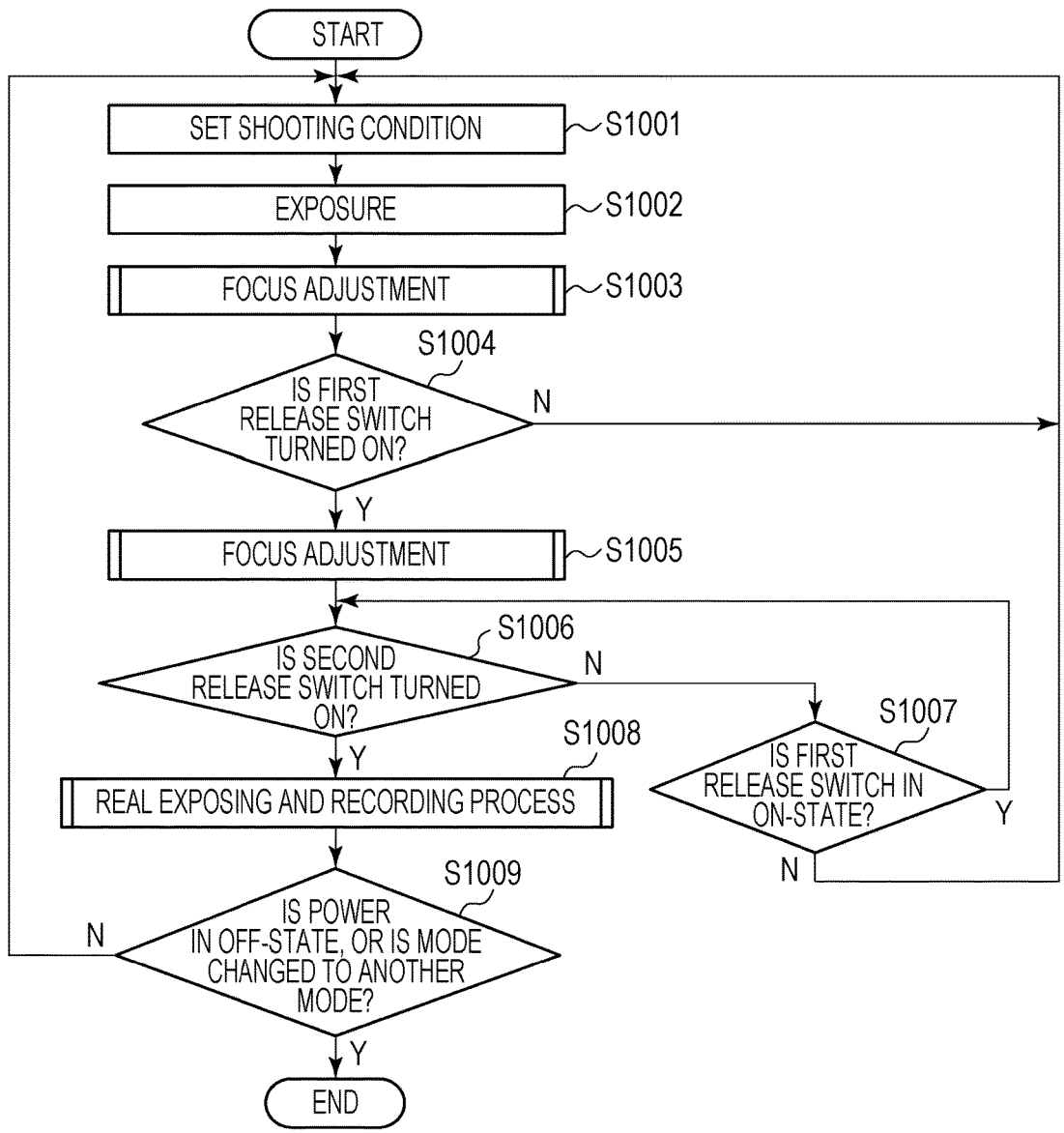
FIG. 10A is a flow chart illustrating an example of an image capturing process by an image capturing apparatus according to the first embodiment.

In FIG. 10A, when the CPU 131 detects turning on of a power supply or setting into an image capture mode, the CPU 131 starts the process. In step S1001, image-capturing conditions in terms of zooming, an aperture condition, a shutter speed, an ISO sensitivity, a white balance, and/or the like are set based on user setting, an output of a metering sensor (not shown), a result of image analysis, and/or the like.

In step S1002, exposing is performed under the image-capturing condition described above.

In step S1003, the correlation calculation is performed using the A image and the A+B image obtained in the exposing in step S1002, and the focus adjustment is performed. The process from step S1001 to step S1003 is performed repeatedly until the first release switch 162 is pressed down (S1004).

In step S1005, in response to turning-on of the first release switch, the focus adjustment process is performed again in a mode in which the focus or the exposure is fixed.

In step S1006, a detection is perform as to whether the second release switch is turned on (whether an image capture command is issued). If the second release switch is in the off-state, then in step S1007, a detection is performed as to whether the first release switch is in the on-state. In a case where the second release switch is in the on-state, the processing flow proceeds to step S1008 to perform a real exposure operation. In a case where the first release switch is in the on-state and the second release switch is in the off-state, the processing flow goes to a waiting state to wait for the second release switch to be turned on while maintaining the image capturing conditions such as an AF condition, an AE condition, and/or the like. In a case where the first release switch is turned off, the processing flow returns to step S1001.

In step S1008, the real exposure is performed under the image-capturing condition determined in step S1005, and a resultant image is recorded. In step S1009, a detection is performed as to whether the power supply is in the off-state or whether the present mode has been changed to a menu display mode, a playback mode, or the like. In a case where the power supply is in the off-state or the present mode has been changed to another mode, the process is ended. In a case where the present mode is further maintained, the processing flow returns to step S1001 to repeat the process. Note that turning-off of the power or changing to another mode may be performed in response to an operation performed by a user.

Figure 10B:
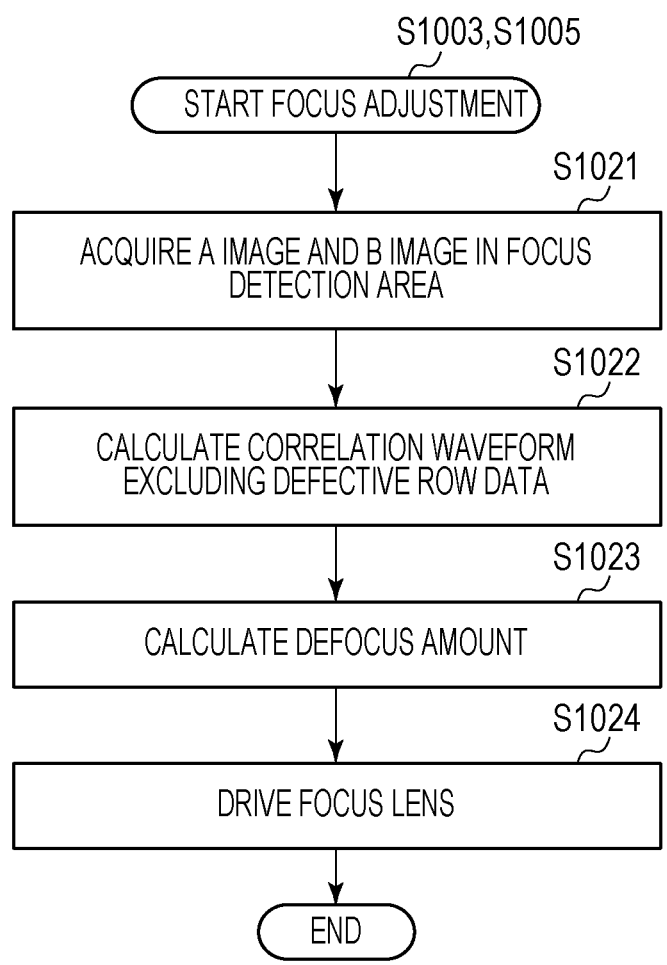
FIG. 10B is a flow chart illustrating an example of a focus adjustment process in the image capturing process by the image capturing apparatus according to the first embodiment.

FIG. 10B is a flow chart illustrating a focus adjustment process executed in step S1003 and step S1005.

In step S1021, the A image and the A+B image in an area (a focus detection area) specified by a user or automatically set as a result of image analysis or the like are read out, and the B image is acquired by the B image generation unit 807 by performing the above-described calculation.

In step S1022, a defective row of the A image is identified based on the defect row data stored in advance, and a correlation waveform is calculated using pixel values in the focus detection area except for an area including the defective row. In this process, the correlation waveform may be determined by cumulatively adding correlation waveforms determined for respective rows, or by adding together pixel values in each column for a particular number of rows. More specifically, the correlation value may be determined by calculating the absolute value of the difference between signal values of respective pixels of the A image and the B image according to formula (1) shown below.

[Math. 1]

$$C(Iy) = \sum_{x=p}^{q} |A_x - B_{x+Iy}| \tag{1}$$

In formula (1), Ax and Bx respectively represent outputs of the A image and the B image at an x coordinate. That is, C(Iy) is the total sum of the absolute values of the differences between the A image and the B image in a state in which the B image is shifted by Iy pixels. The correlation waveform is obtained by plotting the total sums calculated for respective amounts of shift. A point at which the correlation waveform has a minimum value corresponds to the deviation between images. The method of calculating the correlation waveform is not limited to that described above, but other known methods may be employed.

In step S1023, the deviation of images is determined from the correlation waveform obtained in step S1022, and the deviation between images is converted to an amount of defocus.

In step S1024, based on the obtained amount of defocus, the lens controller 141 drives the focus lens of the lens unit 101 to adjust the focus. Thus, the focus adjustment process is completed.

Figure 10C:
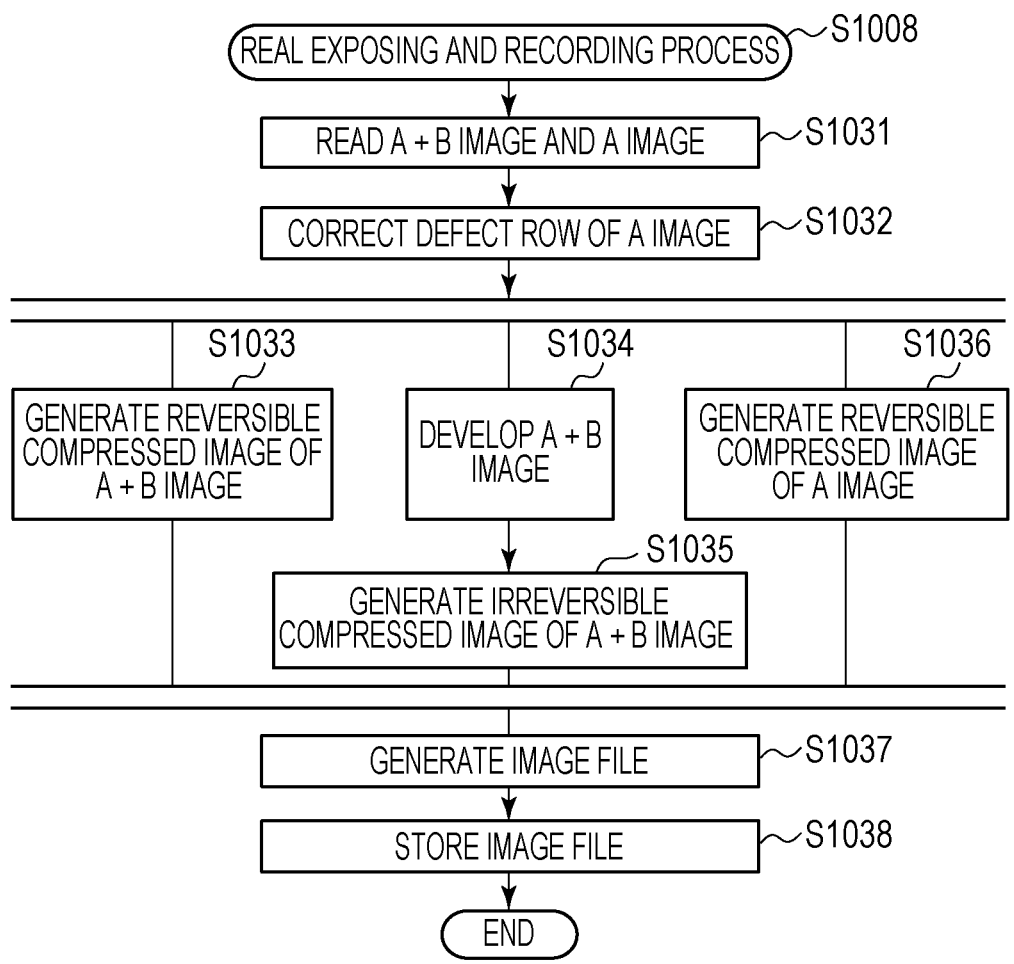
FIG. 10C is a flow chart illustrating an example of an exposing and recording process in the image capturing process by the image capturing apparatus according to the first embodiment.

FIG. 10C is a flow chart illustrating a real exposure and recording process executed in step S1008. In step S1031, the A+B image and the A image acquired in the real exposure process are read out from the image sensing device 103 as described above and output to the image signal processing unit 121A. In step S1032, as described above, the defective-row-of-A-image correction unit 800 performs a defect correction process on the read-out A image using the defect row data stored in advance.

The following steps S1033, S1034, S1035, and S1036 may be performed in parallel. However, these steps may be performed sequentially depending on the available storage space of the memory 132, the processing speed of the image signal processing unit 121A, or the like. The image signal processing unit 121A may be a single processor. In this case, the A+B image and the A image may be processed sequentially.

In step S1033, the reversible compression processing unit 806 performs the reversible compression processing on the A+B image, and stores the resultant A+B image in the memory 132 via the memory interface 804.

In step S1034, the develop processing unit 802 performs various developing processes on the A+B image. Next, in step S1035, the irreversible compression processing unit 803 performs the irreversible compression process and stores the resultant data as an A+B image display image in the memory 132. At the same time, an A+B thumbnail image is generated by reducing the A+B image display image and stored in the memory 132.

In step S1036, the reversible compression processing unit 806 performs the reversible compression processing on the A image and stores the resultant processed A image in the memory 132.

After the steps S1033, S1035, and S1036 are completed, then in step S1037, an image file is generated. In the generation of the image file, the reversibly compressed A+B image and A image, the irreversibly compressed A+B image display image, and the A+B thumbnail image are read out from the memory 132, and a file is generated therefrom. Furthermore, the defect row data of the A image stored in the non-transitory memory 133 is read out and attached to the image file. Details of the structure of the image file will be described later.

In step S1038, the generated image file is stored in the external storage medium 173 via the card input/output unit 171, and the real exposure and recording process is ended.

Structure of Image File

The detailed structure of the image file generated in step S1037 is described below with reference to FIGS. 11A and 11B.

Figure 11A:
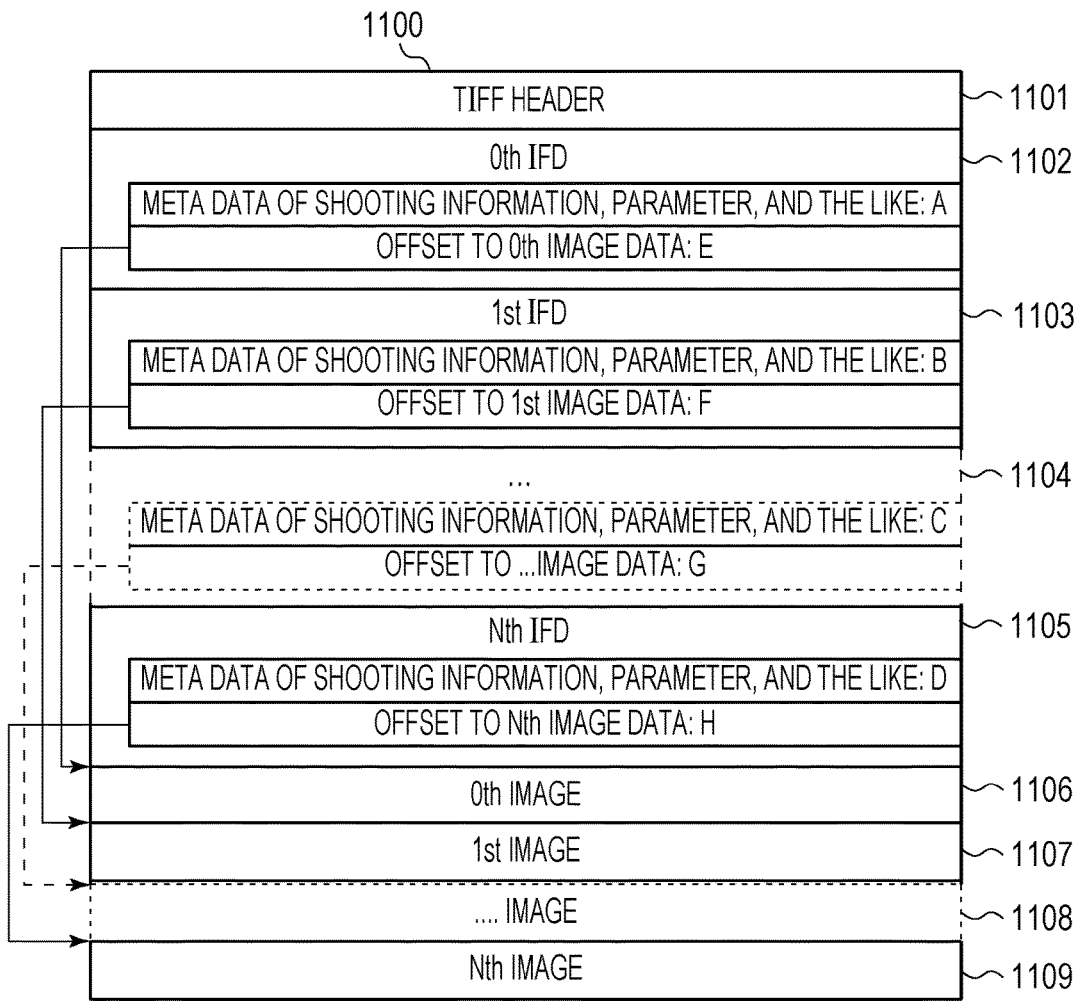
FIG. 11A is a diagram schematically illustrating an example of a known image file format.

FIG. 11A illustrates an image file having a widely employed structure known as a TIFF (Tagged Image File Format) format.

In the TIFF image file 1100, it is allowed to store a plurality of pieces of image data in one file. The TIFF image file 1100 includes a TIFF header part 1101, a plurality of IFD (Image File Directory) parts 1102 to 1105, and a plurality of image data parts 1106 to 1109.

The TIFF header part 1101 is a field in which data is stored to indicate that the present file is in the TIFF file format.

The respective IFD parts 1102 to 1105 are areas for storing metadata A to D describing image capturing information and/or parameters associated with the image data stored in the respective image data parts 1106 to 1109, and offset values E to H to the respective image data parts 1106 to 1109. That is, there are as many IFD parts as the number of pieces of image data.

Each IFD corresponds to one piece of image data. For example, a 0th IFD part 1102 corresponds to a 0th image data part 1106. Thus, starting positions of the respective image data are identified by the offset values E to H of the IFD parts 1102 to 1105.

Figure 11B:
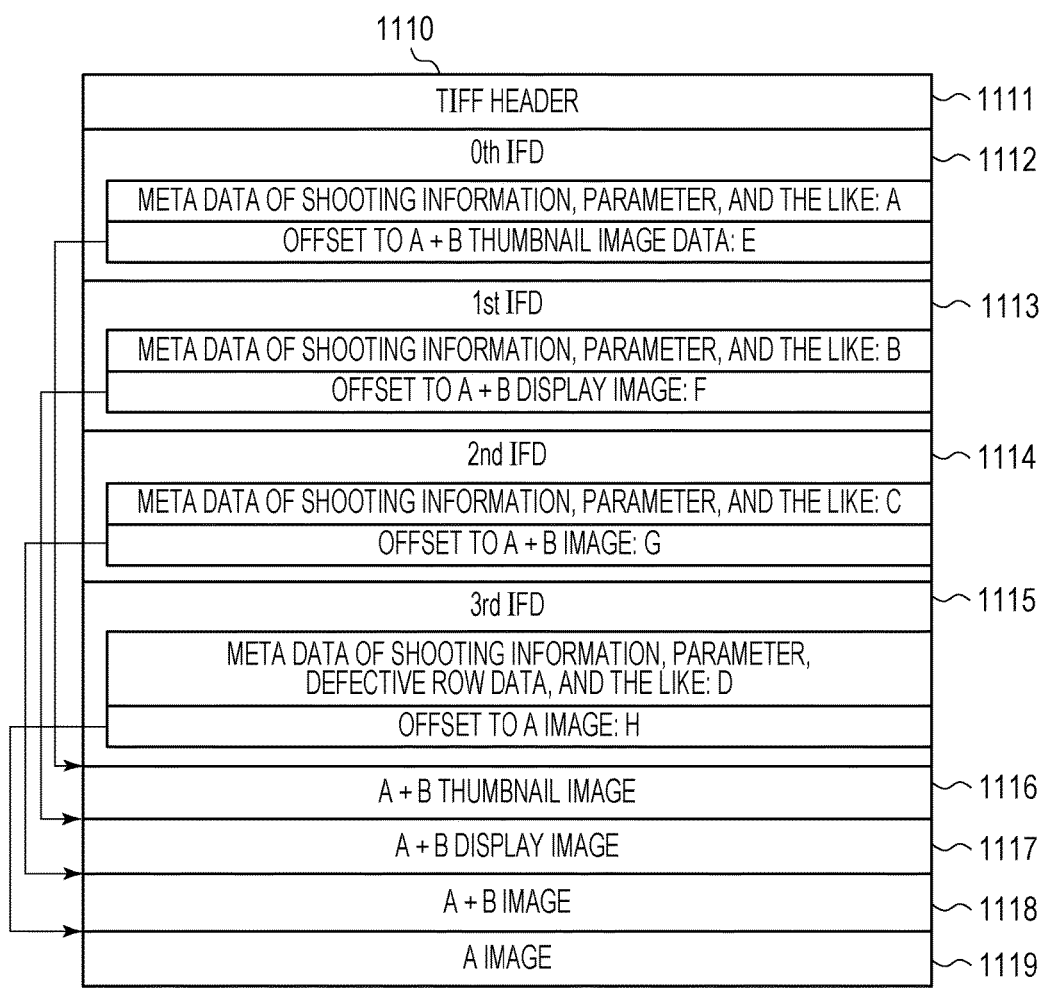
FIG. 11B is a diagram schematically illustrating an example of an image file format according to the first embodiment.

FIG. 11B illustrates an example of a file structure for a case where a TIFF image file is generated so as to include an A+B image, an A image, and data of defective row in A image according to the present embodiment.

The image file 1110 has a TIFF image data format including a TIFF header part 1111, a 0th IFD part 1112 which is an IFD for the A+B thumbnail image and a 1st IFD part 1113 which is an IFD for the A+B image display image. The format of the image file 1110 further includes a 2nd IFD part 1114 which is an IFD for the A+B image, and a 3rd IFD part 1115 which is an IFD for the A image. An image data part includes an A+B thumbnail image part 1116, an A+B image display image part 1117, an A+B image part 1118, and an A image part 1119.

The TIFF header part 1111 is an area for storing data identifying that this file has a TIFF file structure.

The 0th IFD part 1112 is an area in which metadata A such as image capturing information, parameters, and/or the like associated with the A+B thumbnail image part 1116, and an offset value E to the A+B thumbnail image part 1116 are stored.

The 1st IFD part 1113 is an area in which metadata B such as image capturing information, parameters, and/or the like associated with the A+B image display image part 1117, and an offset value F to the A+B image display image part 1117 are stored.

The 2nd IFD part 1114 is an area in which metadata C such as image capturing information, parameters, and/or the like associated with the A+B image part 1118, and an offset value G to the A+B image part 1118 are stored.

The 3rd IFD part 1115 is an area in which metadata D such as image capturing information, parameters, and/or the like associated with the A image part 1119, and an offset value H to the A image part 1119 are stored. Note that in the present embodiment, data of defective rows in the A image is included in the metadata of the A image. However, the stored A image is an image that has already been subjected to the defective row correction, and thus the data of defective rows in the A image does not necessarily need to be stored. Therefore the data of defective rows in the A image may or may not be stored depending on various image capturing conditions or settings made by a user.

FIG. 12 illustrates an example of defect row data. To identify a pixel location where there is a defect, the defect row data includes the total number of pieces of defect row data, and the row number of each defective row. For example, in a case where 10th, 15th, and 30th rows are defective rows, then the defect row data indicates that the total number of defective rows is 3, and the defective rows are located at a 10th row, a 15th row, and 30th row.

Thus, a starting position of each image data is identified by a corresponding one of offset values E to H.

The A+B thumbnail image part 1116 is an area for storing a resized image obtained by thinning and resizing the images stored in the A+B image display image part 1117, for use, for example, in displaying a plurality of images (as indexes) on the display unit 153.

The A+B image display image part 1117 is an area for storing a JPEG image obtained by processing, by the image signal processing unit 121A, the image data output from the image sensing device 103, for use, for example, in displaying on the display unit 153.

The A+B image part 1118 is an area for storing the A+B image obtained by performing the reversible compression processing by the image signal processing unit 121A, for use, after the image capturing operation is completed, for example, in developing the JPEG image by application software or the like according to changed image capturing parameters.

The A image part 1119 is an area in which the A image obtained by performing the reversible compression processing by the image signal processing unit 121A is stored for use together with the A+B image by application software or the like in performing, after the image capturing operation is completed, the refocusing process, the 3-D image generation process, and/or the like.

In performing the refocusing process or the 3-D image generation process after the image capturing operation, the data of defective rows in the A image stored in the 3rd IFD part 1115 may be used to identify the corrected defective row in the various kinds of image processes. In the present embodiment, use of this image file makes it possible for the image processing apparatus to perform a correction process, using the data of defective rows in the A image, on defective rows with higher accuracy than in the correction (interpolation) performed during the recording operation thereby allowing it to obtain higher accuracy and higher image quality in the image processing performed in the image processing apparatus.

Furthermore, the data part of the A image, which is unnecessary for application software or an image processing apparatus whose specifications do allow it to perform the refocusing process or the process of generating a virtual viewpoint image, is stored in the 3rd IFD part 1115. Furthermore, the image data is stored in the A image part 1119 located at the end of the image file 1110. This makes it possible for even application or an apparatus that is not capable of handling the data of the A image to perform the reading operation in a conventional manner, and thus the file compatibility is maintained.

Next, the image file recorded in the above-described manner is read out, decoded, and image-processed, as described below by the image processing apparatus configured as follows. In the present embodiment, it is assumed that the operation is performed mainly by the image signal processing unit 121A in the camera 100. However, in the present disclosure, the image processing apparatus is not limited to that disposed in the image capturing apparatus, but the image processing apparatus may be an arbitrary electronic device capable of acquiring the above-described image file and processing it. Examples of such electronic devices include a portable telephone apparatus, a game machine, a tablet terminal, a personal computer, a watch-type or eyeglass-type information terminal, and the like.

Playback by Image Processing Apparatus

Configuration of various units, including the image signal processing unit 121, of the image processing apparatus and operation thereof are described below.

Figure 13:
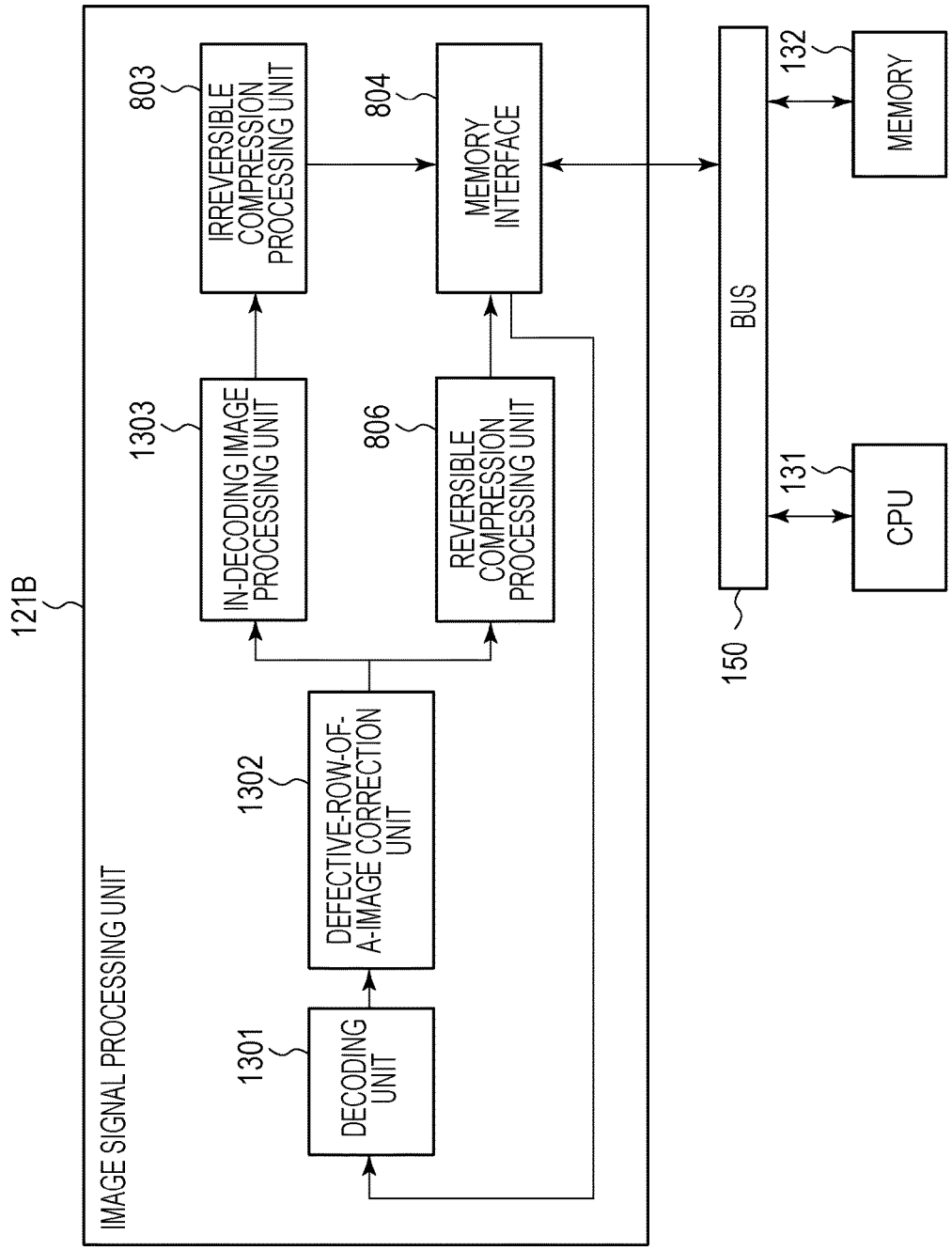
FIG. 13 is a block diagram illustrating an example of a configuration of an image signal processing unit for use in decoding according to the first embodiment.

FIG. 13B illustrates a configuration of an image signal processing unit 121B which is a part, used in the decoding, of the image signal processing unit 121. In this configuration, the image signal processing unit in the image capturing apparatus is employed as the image processing apparatus used in the playback operation. However, alternatively, an external image processing apparatus different from the image capturing apparatus and having a configuration such as that shown in FIG. 13 may be employed.

In the decoding operation, the decoding unit 1301, the defective-row-of-A-image correction unit 1302, and the in-decoding image processing unit 1303 of the image signal processing unit 121B are used. Note that the A image refers here to one parallax image. In the following description, the image processing may be applied in a similar manner to the A image regardless of which pupil area in the imaging optical system the light ray of the A image passes through.

The decoding unit 1301 decodes the above-described image file acquired from the memory 132 via the memory interface 804, and outputs the defect row data and the A image data and the A+B image data converted into the same format as that of the image data output from the image sensing device. In this process, the decoding unit 1301 sequentially analyzes the header part to determine what images are included in the image file. In the present embodiment, as shown in FIG. 11B, the header information of the A image part 1119 and the data part of the A image part 1119 are described at the ends of the respective parts. This makes it possible even for an image processing apparatus whose decoding unit is not capable of handling the output of the A image part 1119 to correctly read out data described in the 0th IFD part 1112 to the 2nd IFD part 1114, and thus compatibility is maintained.

The defective-row-of-A-image correction unit 1302 receives the defect row data, the A image, and the A+B image from the decoding unit 1301. The defective-row-of-A-image correction unit 1302 stores the received defect row data and corrects a row, indicated by the defect row data, of the received A image.

In the correction (decoded-image correction) performed by the defective-row-of-A-image correction unit 1302, a method different from the method employed by the defective-row-of-A-image correction unit 800 described above is employed to achieve higher accuracy in the correction, although the processing load and the circuit complexity may become larger. For example, a most likely pixel value is estimated from 7×7 matrix centered at a pixel of interest, the interpolation is performed using this most likely pixel value. In the correction process performed in the playback or decoding operation by the defective-row-of-A-image correction unit 1302, unlike in the image capturing operation, it is not necessary to take into account an influence of capture intervals (time lag) or the like. This makes it easy to employ the high-accuracy process such as that described above.

The in-decoding image processing unit 1303 generates a B image by subtracting the A image received from the defective-row-of-A-image correction unit 1302 from the A+B image. From the two parallax images of the A image and the B image, the refocusing process or the 3-D image generation process may be performed using a known technique. The in-decoding image processing unit 1303 outputs the image data subjected to such image processing in response to an inputting operation or the like by a user.

The image data output from the in-decoding image processing unit 1303 is input to the irreversible compression processing unit 803. Like in the image capturing operation, the image data is subjected to the irreversible compression process, and resultant irreversibly compressed image is output to the memory 132 via the memory interface 804.

In this process, the reversible compression processing unit 806 performs the reversible compression processing on both the A image and the A+B image output from the defective-row-of-A-image correction unit 800, and outputs the resultant reversibly compressed images to the memory 132 via the memory interface 804.

The process following the above is performed in a similar manner as in the image capturing operation, and thus a further description thereof is omitted.

Figure 14:
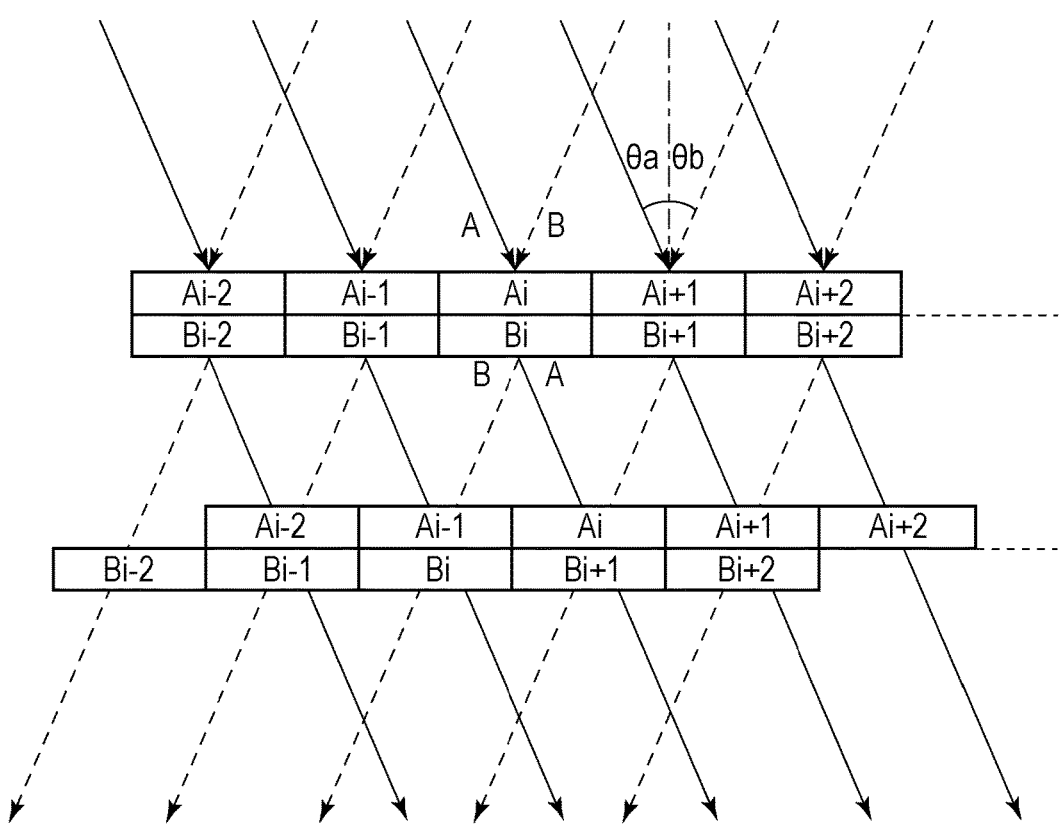
FIG. 14 is a diagram conceptually illustrating a manner in which a refocusing process is performed according to the first embodiment.

An example of the refocusing process performed by the in-decoding image processing unit 1303 is described below. FIG. 14 is a schematic diagram illustrating a manner in which the refocusing process in a one-dimensional direction (row direction, column direction) is performed using the A image and the B image acquired by the image sensing device according to the present embodiment. In this figure, Ai and Bi respectively denote an A image and a B image detected by an i-th pixel in a row of an image sensing device disposed in an image sensing area 1400, where i is an integer. Ai is a sensed light signal output from an i-th pixel in response to a light ray incident thereon with a principal ray angle θa. Bi is a sensed light signal output from the i-th pixel in response to a light ray incident thereon with a principal ray angle θb.

Note that Ai and Bi each have not only light intensity distribution information but also incident angle information. Therefore, if Ai is translated along the angle θa to a virtual imaging plane 1410 and Bi is translated along the angle θb to the virtual imaging plane 1410, and if they are added together, then a refocus signal on the virtual imaging plane 1410 is generated. Similarly, if Ai and Bi are shifted by an amount corresponding to as many pixels as an integer and they are added together, then a refocus image on a virtual imaging plane corresponding to the amount of shifting is generated.

In the present embodiment, there are two pixels covered with one microlens, and the refocusing process is performed in a simple manner as described above. However, the refocusing process is not limited to that described above. For example, the refocusing process may be performed using a calculation known as light field photography, which may be employed also in a case where an image is divided into more sub-images.

In the image processing performed by the in-decoding image processing unit 1303, the A image and the B image at each pixel may be subjected to weighted-addition such that an image as seen from a virtually changed viewpoint is generated, that is, a virtual viewpoint image may be generated.

The correlation calculation unit 808 is capable of performing a correlation calculation process also in the playback operation in addition to the shooting operation. For example, in a case where in the playback operation, the amount of defocus is again detected and the refocusing is performed or a defocus map is generated, the correlation calculation using the A image and the B image may be performed. In this case, the A image and the B image used in the correlation calculation may be those images read out from the image file for which the correction on the defective rows in the A image has already been performed in the recording operation, or the correlation calculation may be performed excluding defective row data of the A image and the B image. That is, when the correlation calculation is performed in the image processing by the in-decoding image processing unit 1303, data corresponding to a defective signal may be excluded.

In the present embodiment, as described above, in the calculation performed in the camera in the image capturing and recording operation, no correction is made on signals from defective groups of pixels in a parallax image, but they are excluded from the calculation. On the other hand, when a parallax image is recorded, signals from defective groups of pixels are corrected and a resultant image is recorded. This makes it possible to reduce an influence of a defect in part of parallax images on a recorded image. It also becomes possible to reduce an influence of a defect in a parallax image on image processing or an image subjected to the image processing.

In the present embodiment, data (defect row data) indicating a defective group of pixels in a parallax image is described in an IFD part of the parallax image. Alternatively, the defect row data may be described at the beginning of an IFD part of an image file. Alternatively, the defect row data may be described in another file and the file may be related to the parallax image using a file name or the like.

Second Embodiment

In the first embodiment described above, a correction is made on a parallax image, and the resultant corrected parallax image is recorded to reduce an influence on image processing performed using the parallax image. In a second embodiment, in contrast, no correction is performed on a signal from a defective group of pixels in a recording process after the image capturing operation, but a parallax image and data of a defect row in the parallax image are stored in relation to each other.

Figure 15:
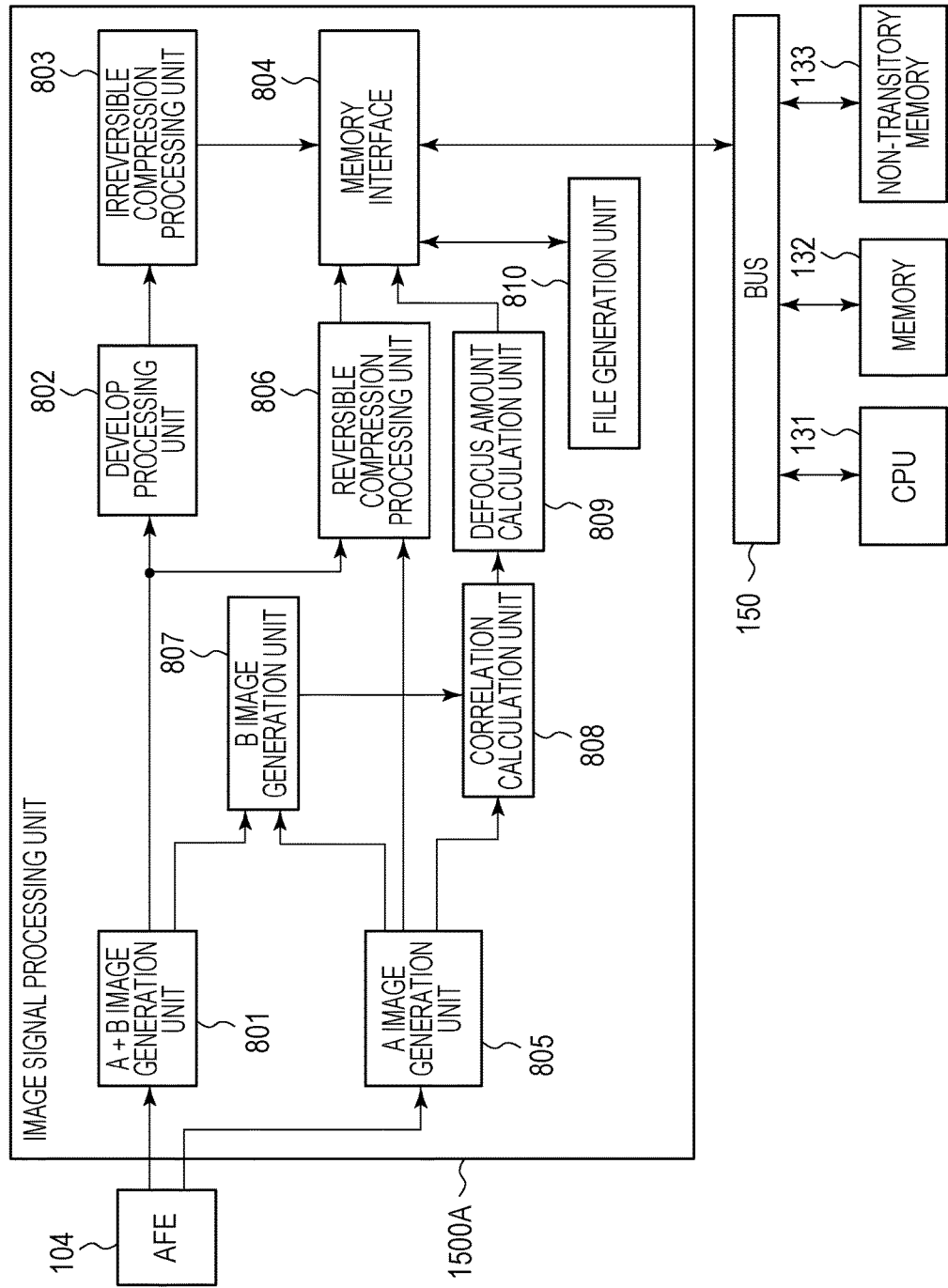
FIG. 15 is a block diagram illustrating an example of a configuration of an image signal processing unit according to a second embodiment.

FIG. 15 is a block diagram of an image signal processing unit 1500A according to the present embodiment used instead of the image signal processing unit 121A shown in FIG. 1. The other blocks in FIG. 1 according to the first embodiment are similar to those according to the second embodiment, and thus a further description thereof is omitted. Unlike the image signal processing unit 121A shown in FIG. 8 according to the first embodiment, the image signal processing unit 1500A according to the second embodiment does not include the defective-row-of-A-image correction unit 800.

Furthermore, in the second embodiment, unlike the first embodiment, the defective row correction process on the A image in step S1032 shown in FIG. 10C is not performed.

In the present embodiment, an image signal processing unit 121B similar to that according to the first embodiment is provided. As described above in the first embodiment, the image signal processing unit 121B has a function of correcting a decoded A image based on input defect row data. Therefore, even in a case where the A image included in the input image file has not been subjected to the correction, it is possible to correct a pixel signal in a defective row in the A image during the decoding operation, as in the first embodiment.

In the present embodiment, as described above, in the calculation performed in a camera during the image capturing and recording operation, no correction is performed on a signal from a defective group of pixels in a parallax image, and such a signal is excluded from the calculation. As for the parallax image to be recorded, data associated with the signal from the defective group of pixels is recorded in relation to the parallax image. This makes it possible to perform image processing in the playback operation taking into account a defect occurring in part of the recorded parallax image such that an influence of the defect is suppressed.

In the embodiments described above, a defective row in the A image is corrected by performing the interpolation using a row before or after the defective row in the A image. However, the correction method is not limited to this. For example, the A image for which the defective row has been interpolated in the above-described manner may be subtracted from the A+B image thereby generating a B image, and the resultant B image may be recorded instead of the A image. Note that the A image and the A+B image are obtained via analog-to-digital conversion performed at different timings, and thus by converting the A image of the defective row subjected to the interpolation to the B image, analog noise components caused by the time difference in the analog-to-digital conversion are superimposed. This makes it possible to reduce an unnatural monotonic color tone caused by the interpolation in the recorded image.

Furthermore, in the embodiments described above, because signal lines for reading out charges from pixels are shared on a row-by-row basis, if short-circuiting of a signal line occurs, this results in a defect over this whole signal line, that is, a defective row occurs. Thus, the correction is made on a row-by-row based on the defective rows, and data of a defective group of pixels becomes defective for the whole row. However, signals lines for reading out signals from pixels do not necessarily need to be configured in the above-described manner, and thus defective pixels do not necessarily occur on a row-by-row basis. In such a case, defective pixel group data may be described and stored in a proper manner depending on the structure of the image sensing device, and the correction may be made in a proper manner.

While the present disclosure has been described with reference to embodiments, the invention is not limited to the disclosed embodiments, and many modifications and changes are possible within the sprit and the scope of the disclosure.

Other Embodiments

The present disclosure may also be implemented as follows. That is, a program code of software for implementing the functions disclosed in the embodiments is stored in a storage medium and, and the storage medium is provided to a system or an apparatus, and a computer (or a CPU or an MPU) in the system or the apparatus reads out the program code from the storage medium and executes it.

In this case, the program code read from the storage medium implements the novel functions disclosed in the embodiments, and the program and the storage medium on which the program code is stored fall within the scope of the present disclosure.

Examples of storage media for supplying the program code include a floppy disk, a hard disk, an optical disk, a magneto-optical disk, and the like. Further examples are a CD-ROM disk, a CD-R disk, a CD-RW disk, a DVD-ROM disk, a DVD-RAM disk, a DVD-RW disk, a DVD-R disk, a magnetic tape, a non-volatile memory card, a ROM, and the like.

The functions disclosed in the embodiments described above may be implemented by executing the program code read out by a computer. Part or all of the process may be performed by an operating system or the like running on the computer in accordance with the program code. Such implementation of the functions also falls within the scope of the present disclosure.

The functions may also be implemented as follows. The program code is read out from the storage medium and loaded into a memory of an extension card inserted in a computer or into a memory of an extension unit connected to the computer, and part or all of the process is performed by a CPU or the like disposed on the extension card or the extension unit in accordance with the loaded program code.

The present disclosure may be applied not only to a device such as a digital camera for mainly capturing an image but to other types of devices including an image capturing apparatus disposed therein or capable of being connected to an image capturing apparatus, such as a portable telephone, a personal computer (of laptop type, desk-top type, tablet type, or the like), a game machine, and the like. Therefore, it should be understood that the "image capturing apparatus" in the present description is an arbitrary electronic device having an image capturing function.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-180065, filed Sep. 11, 2015, which is hereby incorporated by reference herein in its entirety.

The invention claimed is:
1. An image capturing apparatus comprising:
   an image sensing device including a plurality of groups of pixels, each pixel of each group of pixels including a plurality of photoelectric conversion elements;
   one or more processors; and a memory storing instructions which, when the instructions are executed by the one or more processors, cause the image processing apparatus to function as:
a reading unit configured to perform, on a plurality of groups of pixels, a reading-out operation for reading out a signal as a first signal from part of the plurality of photoelectric conversion elements and a reading-out operation for mixing signals from the plurality of photoelectric conversion elements and reading out a resultant mixed signal as an image signal;
a correction unit configured to make a correction based on defect data which is data indicating a group of pixels for which when signals are read out from the photoelectric conversion elements by the reading unit, the first signal read from this group of pixels is defective while the image signal read out from this group of pixels is not defective, the correction being made on the first signal read out from the group of pixels indicated by the defect data; and
a generation unit configured to generate one image file including the first signal corrected by the correction unit and the image signal.

2. The image capturing apparatus according to claim 1, wherein the defect data is data indicating a group of pixels for which a defect occurs owing to a defect of a signal line for providing an instruction to output a signal from a photoelectric conversion element.

3. The image capturing apparatus according to claim 1, further comprising a recording unit configured to record an image file generated by the generation unit in a recording medium,
wherein the generation unit generates the image file so as to further include the defect data.

4. The image capturing apparatus according to claim 1, further comprising a storage unit configured to store in advance the defect data.

5. The image capturing apparatus according to claim 1, further comprising
a generation unit configured to generate a second signal using the image signal and the first signal, and
a calculation unit configured to perform a correlation calculation based on the first signal and the second signal,
wherein the calculation unit performs the calculation such that in a case where the defect data indicates that a first signal in a plurality of first signals is defective, the defective first signal is not used in the calculation.

6. The image capturing apparatus according to claim 1, wherein the image sensing device is configured such that a plurality of photoelectric conversion elements included in each pixel respectively detect light rays passing through different exit pupils of an imaging optical system.

7. The image capturing apparatus according to claim 1, wherein the correction unit corrects, based on the defect data, the first signal read from a defective group of pixels by interpolation using signals of pixels located in the vicinity of the group of pixels.

8. The image capturing apparatus according to claim 1, wherein the correction unit performs the correction on the first signal obtained in response to an instruction to capture an image to be recorded in a recording medium.

9. The image capturing apparatus according to claim 5, wherein the correction unit performs a correlation calculation on the first signal and the image signal obtained before an instruction to capture an image to be recorded in a recording medium is issued.

10. The image capturing apparatus according to claim 1, wherein the image file is a TIFF image file.

11. The image capturing apparatus according to claim 10, wherein the image file includes an IFD part corresponding to the first signal and data of the first signal, the IFD part being located at an end of a plurality of IFD parts of the image file, and the data of the first signal being located at an end of an image data part of the image file.

12. The image capturing apparatus according to claim 3, wherein the image file is a TIFF image file, and the defect data is stored in an IFD part corresponding to the first signal.

13. The image capturing apparatus according to claim 1, further comprising
a decoding unit configured to decode the image signal and the first signal from the image file recorded in the recording medium, and
an in-decoding correction unit configured to correct the defect of the first signal decoded by the decoding unit with higher accuracy than the accuracy provided by the correction unit.

14. The image capturing apparatus according to claim 13, further comprising an image processing unit configured to perform image processing on the first signal corrected by the in-decoding correction unit and the image signal, wherein the image processing performed by the image processing unit is a refocusing process to generate an image signal having a focal position moved to a virtual image plane.

15. The image capturing apparatus according to claim 13, further comprising an image processing unit configured to perform image processing on the first signal corrected by the decoded-signal correction unit and the image signal,
wherein the image processing performed by the image processing unit is image processing to generate a virtual viewpoint image as seen from a virtual viewpoint.

16. The image capturing apparatus according to claim 1, further comprising
a decoding unit configured to decode the image signal and the first signal from the image file recorded in the recording medium, and
an image processing unit configured to perform image processing on the first signal and the image signal decoded by the decoding unit,
wherein the image processing performed by the image processing unit is a refocusing process to generate an image signal having a focal position moved to a virtual image plane.

17. The image capturing apparatus according to claim 1, further comprising
a decoding unit configured to decode the image signal and the first signal from the image file recorded in the recording medium, and
an image processing unit configured to perform image processing on the first signal and the image signal decoded by the decoding unit,
wherein the image processing performed by the image processing unit is image processing to generate a virtual viewpoint image as seen from a virtual viewpoint.

18. A method of controlling an image capturing apparatus including a plurality of groups of pixels, each pixel of each group of pixels including a plurality of photoelectric conversion elements, the method comprising:
performing a first reading-out operation on a plurality of groups of pixels to read out a signal as a first signal from part of the photoelectric conversion elements;

performing a second reading-out operation on a plurality of groups of pixels to mix signals from the plurality of photoelectric conversion elements and read out a resultant mixed signal as an image signal;

making a correction based on defect data which is data indicating a defective group of pixels for which when signals are read out from the photoelectric conversion elements in the first and second reading-out operations, the first signal is defective while the image signal is not defective, the correction being made on the first signal read out from the defective group of pixels; and generating one image file including the corrected first signal and the image signal.

19. A non-transitory computer-executable program comprising a description of a procedure of the method of controlling an image capturing apparatus according to claim 18.

20. A non-transitory computer-readable storage medium in which a program is stored for causing a computer to execute processes of the method of controlling an image capturing apparatus according to claim 17.

21. An image processing apparatus comprising:
one or more processors; and
a memory storing instructions which, when the instructions are executed by the one or more processors, cause the image processing apparatus to function as:
an acquisition unit configured to acquire an image file including a first signal, an image signal, and defect data, the first signal and the image signal being signals obtained from an image sensing device including a plurality of groups of pixels, each pixel of each group of pixels including a plurality of photoelectric conversion elements, the first signal being a signal from part of the plurality of photoelectric conversion elements, the image signal being a signal obtained by mixing signals from the plurality of photoelectric conversion elements, the defect data being data indicating a group of pixels for which when signals are read out from the plurality of photoelectric conversion elements, the first signal is defective although the image signal is not defective;
a decoding unit configured to decode the image signal and the first signal from the image file;
an in-decoding correction unit configured to correct the defect of the first signal decoded by the decoding unit based on the defect data; and
an image processing unit configured to perform image processing on the first signal corrected by the in-decoding correction unit and the image signal.

22. The image processing apparatus according to claim 21, further comprising a calculation unit configured to perform a correlation calculation such that in a case where the defect data indicates that a first signal in a plurality of first signals decoded by the decoding unit is defective, the defective first signal is not used in the calculation.

23. The image processing apparatus according to claim 21, wherein the image processing performed by the image processing unit is a refocusing process to generate an image signal having a focal position moved to a virtual image plane.

24. The image processing apparatus according to claim 21 wherein the image processing performed by the image processing unit is image processing to generate a virtual viewpoint image as seen from a virtual viewpoint.

25. A method of controlling an image processing apparatus, the image processing apparatus configured to process a first signal, an image signal, and defect data, the first signal and the image signal being signals obtained from an image sensing device, the image sensing device including a plurality of pixels each including a plurality of photoelectric conversion elements, signals from the plurality of photoelectric conversion elements being readable on a part-by-part basis, the first signal being a signal from part of the plurality of photoelectric conversion elements, the image signal being a signal obtained by mixing signals from the plurality of photoelectric conversion elements, the defect data being data indicating a group of pixels for which the first signal is defective owing to a defect of the image sensing device while the image signal is not defective, the method comprising:
decoding the image signal and the first signal;
performing an in-decoding correction to correct the defect of the decoded first signal based on the defect data; and
performing image processing on the corrected first signal and the image signal.

26. A computer-executable program comprising a description of a procedure of the method of controlling an image processing apparatus according to claim 25.

27. A computer-readable storage medium in which a program is stored for causing a computer to execute processes of the method of controlling an image processing apparatus according to claim 25.

28. An image capturing apparatus comprising:
an image sensing device including a plurality of groups of pixels, each pixel of each group of pixels including a plurality of photoelectric conversion elements;
a reading unit configured to perform, on a plurality of groups of pixels, a reading-out operation for reading out a signal as a first signal from part of the plurality of photoelectric conversion elements and a reading-out operation for mixing the signals from the plurality of photoelectric conversion elements and reading out a resultant mixed signal as an image signal; and
a generation unit configured to generate one image file including defect data, the first signal, and the image signal, the defect data being data indicating a group of pixels for which when signals are read out from the plurality of photoelectric conversion elements by the reading unit, the first signal is defective while the image signal is not defective, and
wherein the image file is a TIFF image file, and
the image file includes an IFD part corresponding to the first signal and data of the first signal, the IFD part being located at an end of a plurality of IFD parts of the image file, and the data of the first signal being located at an end of an image data part of the image file.

29. A method of controlling an image capturing apparatus including a plurality of groups of pixels, each pixel of each group of pixels including a plurality of photoelectric conversion elements, the method comprising:
performing a first reading-out operation on a plurality of groups of pixels to read out a signal as a first signal from part of the photoelectric conversion elements,
performing a second reading-out operation on a plurality of groups of pixels to mix signals from the plurality of photoelectric conversion elements and read out a resultant mixed signal as an image signal; and
generating one image file including defect data, the first signal, and the image signal, the defect data being data indicating a defective group of pixels for which when signals are read out from the photoelectric conversion elements in the first and second reading-out operations, the first signal is defective while the image signal is not defective, and wherein the image file is a TIFF image file, and
the image file includes an IFD part corresponding to the first signal and data of the first signal, the IFD part being located at an end of a plurality of IFD parts of the image file, and the data of the first signal being located at an end of an image data part of the image file.

* * * * *